United States Patent [19]
Lane, Jr. et al.

[11] Patent Number: 5,823,570
[45] Date of Patent: Oct. 20, 1998

[54] SEAT BELT RETRACTOR WITH ENERGY MANAGEMENT

[75] Inventors: Wendell C. Lane, Jr., Romeo; Barney J. Bauer, Fenton; Charles E. Steffens, Jr., Washington; Robert D. Sayles, Rochester, all of Mich.

[73] Assignee: TRW Vehicle Safety Systems Inc., Lyndhurst, Ohio

[21] Appl. No.: 728,790

[22] Filed: Oct. 10, 1996

[51] Int. Cl.$^6$ ................................................... B60R 22/28
[52] U.S. Cl. .......................... 280/806; 297/476; 297/472; 188/375; 242/379.1
[58] Field of Search .................................... 280/805, 806; 297/470, 471, 472, 477, 478, 479, 480; 188/371, 374, 375; 242/379.1

[56] References Cited

U.S. PATENT DOCUMENTS

| | | |
|---|---|---|
| 3,632,060 | 1/1972 | Balder . |
| 3,666,198 | 5/1972 | Neumann . |
| 3,881,667 | 5/1975 | Tandetzke . |
| 3,952,967 | 4/1976 | Barile et al. . |
| 4,273,361 | 6/1981 | Takei et al. . |
| 5,613,647 | 3/1997 | Dybro et al. .......................... 242/379.1 |

*Primary Examiner*—Paul N. Dickson
*Attorney, Agent, or Firm*—Tarolli, Sundheim, Covell, Tummino & Szabo

[57] ABSTRACT

A spool sleeve (78) is rotatable in webbing withdrawal and webbing retraction directions (A, B). A lock pawl (122) engageable with a ratchet wheel (114), stops rotation of the spool sleeve (78) in the webbing withdrawal direction (A). The spool sleeve (78) is rotatable relative to the ratchet wheel (114) upon the occurrence of tension in webbing (16) above a predetermined amount. A cutter (94) is located radially within the spool sleeve (78) for cutting the spool sleeve (78) when the spool sleeve (78) rotates relative to the stopped ratchet wheel (114). In one preferred embodiment, the cutter (220) includes a portion (226) which is inclined with respect to a plane perpendicular to a rotational axis (164) of the spool sleeve (192) to cause the cutter (220) to move axially relative to the spool sleeve. In another preferred embodiment, the spool sleeve (284, 286) is comprised of a plurality of pieces fitted together to extend around the axis (164). In another preferred embodiment, the rotation of the spool sleeve (396, 398) is resisted and the amount of resistance can be changed. Two cutters (472, 510) provide different amounts of resistance when they cut the spool sleeve (396, 398).

52 Claims, 15 Drawing Sheets

SEAT BELT RETRACTOR WITH ENERGY MANAGEMENT

BACKGROUND OF THE INVENTION

A known seat belt webbing system for restraining an occupant of a vehicle includes seat belt webbing, a seat belt buckle, and a webbing retractor. A tongue is connected to the webbing and is releasably lockable in the buckle when the webbing is extended across the vehicle occupant. The retractor includes a spool upon which the webbing is wound. The spool rotates in a webbing withdrawal direction when the vehicle occupant extracts the webbing from the retractor. A rewind spring of the retractor rotates the spool in a webbing retraction direction to retract the webbing into the retractor.

When the vehicle experiences a sudden deceleration, a vehicle occupant using the seat belt webbing system applies a force against the webbing. The force which is applied to the webbing urges the spool to rotate in the webbing withdrawal direction. The retractor includes a blocking mechanism which blocks rotation of the spool in the webbing withdrawal direction in response to sudden vehicle deceleration. Thus, the blocking mechanism prevents further withdrawal of the webbing from the retractor, and the webbing restrains forward movement of the vehicle occupant.

SUMMARY OF THE INVENTION

The present invention relates to a seat belt webbing retractor. The retractor includes a spool sleeve around which seat belt webbing is wound. The spool sleeve is rotatable about a rotational axis in webbing withdrawal and webbing retraction directions. A means stops rotation of the spool sleeve in the webbing withdrawal direction. A means enables rotation of the spool sleeve in the webbing withdrawal direction subsequent to being stopped by the means for stopping and upon the occurrence of tension in the webbing above a predetermined amount. A cutter means is located radially within the spool sleeve for cutting into the spool sleeve when the spool sleeve rotates in the webbing withdrawal direction subsequent to being stopped by the means for stopping and in response to tension in the webbing above the predetermined amount.

In one embodiment, the cutter means includes a portion which is inclined with respect to a plane perpendicular to the rotational axis of the spool sleeve. The portion causes the cutter means to move axially relative to the spool sleeve during cutting of the spool sleeve by the cutter means. In another embodiment, the spool sleeve is comprised of a plurality of pieces fitted together and extending around the axis. In yet another embodiment, the cutter means is part of a means for resisting rotation of the spool sleeve in the webbing withdrawal direction. In this embodiment, the retractor includes means for changing the amount of resistance provided by the means for resisting.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
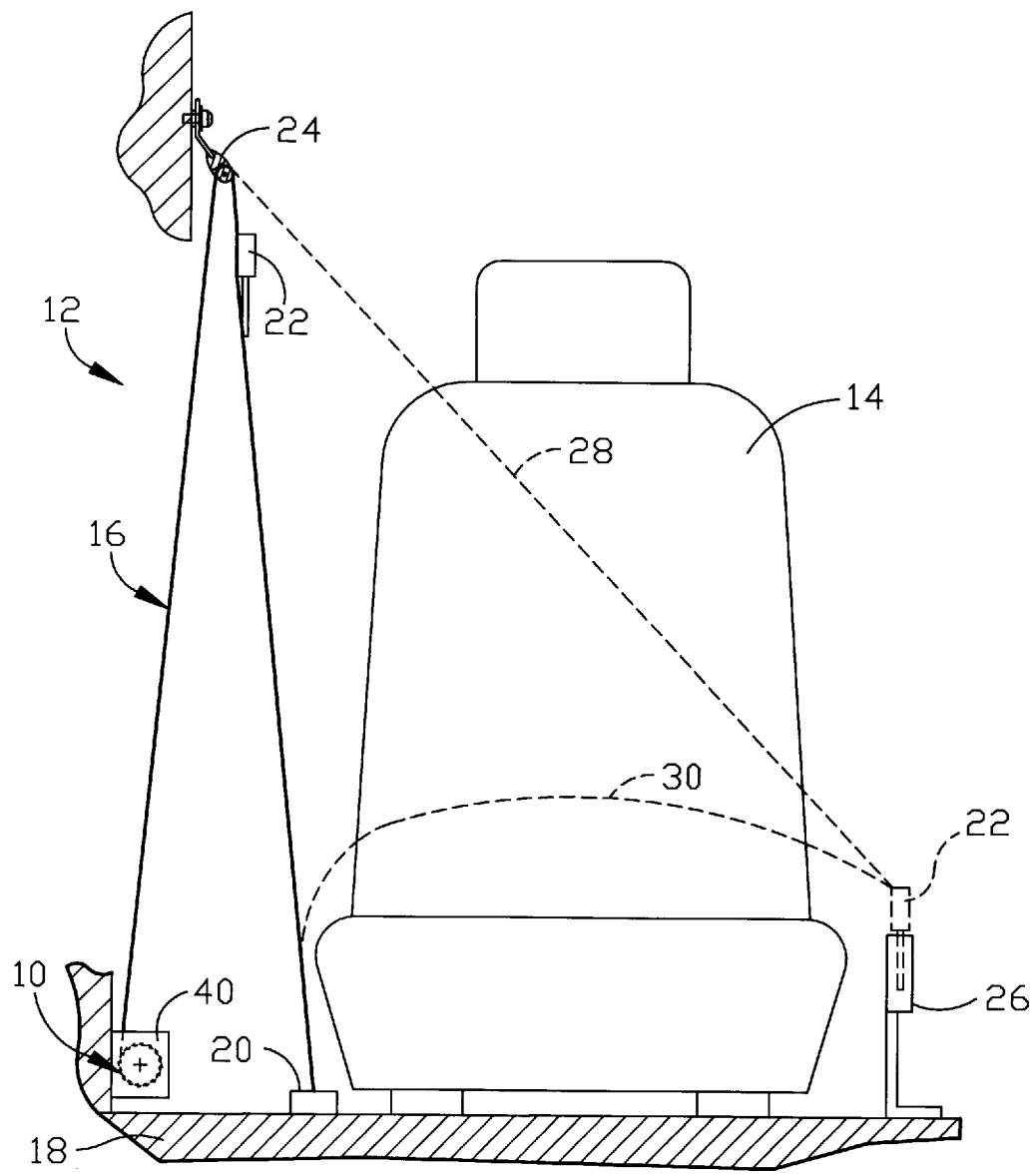
FIG. 1 is a schematic illustration of a seat belt webbing restraint system which includes a retractor according to the present invention.

The present invention relates to a retractor for a seat belt webbing restraint system. The present invention is applicable to various retractor constructions and is also applicable to various seat belt webbing restraint systems. As representative of the invention, a retractor 10 in a seat belt webbing system 12 is illustrated in FIG. 1.

During operation of a vehicle, an occupant (not shown) of the vehicle sits on a seat 14 which is illustrated as a front passenger seat in a vehicle. A length of seat belt webbing 16 is extensible about the vehicle occupant. One end of the webbing 16 is anchored to the vehicle body 18 at an anchor point 20 located on one side of the seat 14. The opposite end of the webbing 16 is attached to the retractor 10 which is secured to the vehicle body 18 on the same side of the seat 14 as the anchor point 20. Intermediate its ends, the webbing 16 passes through a tongue assembly 22 and a D-ring 24 that is located above the retractor 10 and the anchor point 20. When the seat belt webbing system 12 is not in use, the webbing 16 is wound on the retractor 10 and is oriented generally vertically on one side of the seat 14, as is shown in solid lines in FIG. 1.

To use the seat belt webbing system 12, the tongue assembly 22 is manually grasped and pulled across the lap and torso of the vehicle occupant sitting in the seat 14. As the tongue assembly 22 is pulled across the lap and torso of the vehicle occupant, the tongue assembly moves along the webbing 16 and the webbing is unwound from the retractor 10. When the webbing 16 has been pulled across the lap and torso of the vehicle occupant, the tongue assembly 22 is connected with a buckle 26, as shown in dashed lines in FIG. 1. The buckle 26 is connected to the vehicle body 18 and is disposed upon the side of the seat 14 opposite the anchor point 20. When the seat belt webbing system 12 is thus buckled, the length of the webbing 16 is divided by the tongue assembly 22 into a torso portion 28 which extends across the torso of the vehicle occupant and a lap portion 30 which extends across the lap of the vehicle occupant.

The retractor 10 includes a frame 40 which is fixed to the vehicle body 18 by any suitable fastening mechanism (not shown). The frame 40 is U-shaped (FIG. 2) and is made of metal or other suitable material. The frame 40 has two sides 42, and each side has an opening 44. The centers of the openings 44 are aligned along an axis 46 which extends perpendicular to the sides 42. Bushings 48 are located in the openings 44. Preferably, the bushings 48 are made of a plastic material. However, other suitable material may be used.

A shaft 50 of the retractor 10 is made of metal or other suitable material. The shaft 50 has cylindrical portions 52 and 54 which are located at opposite ends of the shaft. Intermediate the two cylindrical portions 52 and 54 is a portion 56 which has a square cross-section with major and minor radii. Other suitable shapes may be used for the portion 56, e.g., the portion 56 may be splined.

The shaft 50 extends along the axis 46 and the cylindrical portions 52, 54 extend through the bushings 48 in the frame 40. A suitable means prevents axial movement of the shaft 50 relative to the frame 40. For example, the shaft 50 may have a groove 58 in which a retainer 60 is located. The shaft 50 is rotatable about the axis 46 relative to the frame 40.

A spool assembly 64 of the retractor 10 includes two disks 66. The disks 66 have the same structural features and only one of the disks is discussed, with particular reference to FIG. 3. The disk 66 (only one shown in FIG. 3) is made of metal or other suitable material. The disk 66 is a flat plate lying perpendicular to the axis 46 and having a smooth, circular outer peripheral surface. A circular center hole 68 extends through the disk 66 and is centered on the axis 46. The radius of the hole 68 is larger than the largest radius of the portion 56 (FIG. 2) of the shaft 50.

The retractor 10 also includes two bushings 70 (only one shown in FIG. 3), which are identical. Only one of the bushings is discussed, with particular reference to FIG. 3. The bushing 70 is preferably made of plastic. However, other suitable material may be used. The bushing 70 has a circular outer peripheral surface 72 with a radius that is slightly smaller than the radius of the center hole 68 in the disk 66. A square center hole 74 of the bushing 70 is centered on the axis 46. The center hole 74 has slightly larger dimensions than the portion 56 of the shaft 50 (not shown in FIG. 3, see FIG. 4) to permit a slip fit between the bushing and the shaft. If the portion 56 of the shaft 50 had a different shape, such as splined or otherwise, the center hole 74 of the bushing would be correspondingly shaped.

The bushing 70 (FIG. 2) is located on the portion 56 of the shaft 50 and is located within the center hole 68 of the disk 66. The bushing 70 is fixed for rotation with the shaft 50 because of the interfitting shaped surfaces that define the center hole 74 and the outer surface of the shaft. The disk 66 can rotate relative to the bushing 70 by sliding on the outer surface 72 of the bushing. Some resistance to the rotation of the disk 66 on the bushing 70 is present, such as frictional resistance between the disk and the bushing.

The spool assembly 64 includes a spool sleeve 78. The spool sleeve 78 is preferably metal, e.g., brass or aluminum. Other suitable materials may be used for the spool sleeve, e.g., plastic. The spool sleeve 78 is a hollow cylinder, concentric about the axis 46. Two end faces 80 (only one identified in FIG. 3) of the spool sleeve 78 extend perpendicular to the axis 46.

A cylindrical outer surface 82 of the spool sleeve 78 extends between the two end faces 80. A groove 84 in the spool sleeve 78 extends along the outer surface 82 for the length of the spool sleeve 78 and is parallel to the axis 46. The groove 84 may be any suitable shape, and in one embodiment the groove has a rounded trough shape.

Figure 5:
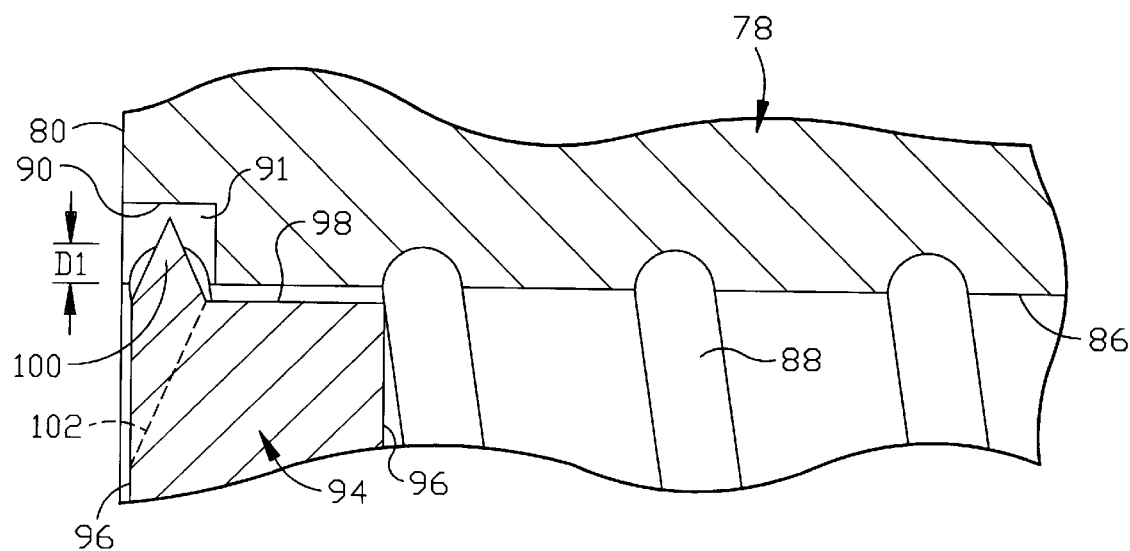
FIG. 5 is an enlarged portion of FIG. 2.
Figure 8:
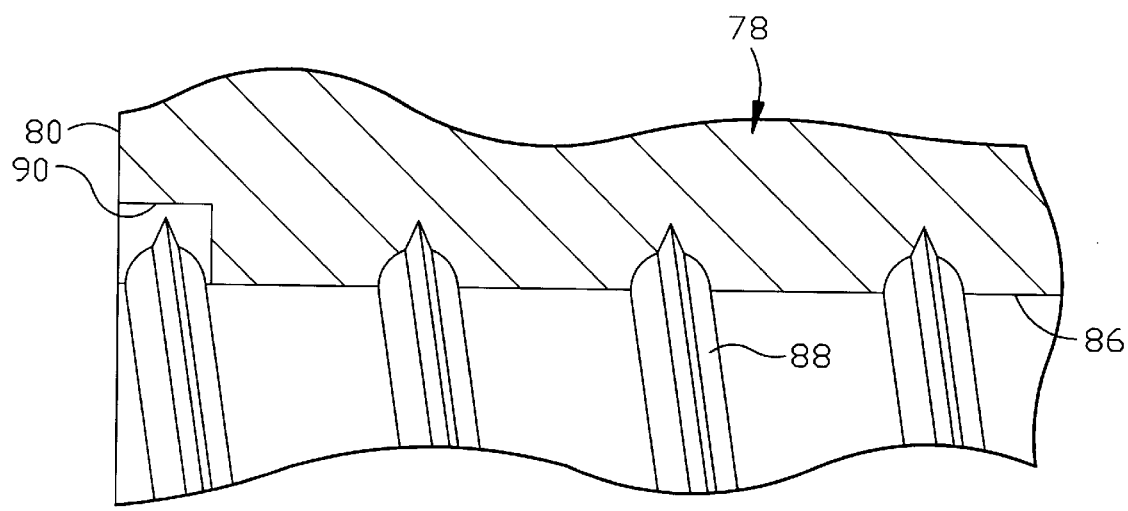
FIG. 8 is an enlarged portion of FIG. 7.

The spool sleeve 78 has an inner surface 86. The inner surface 86 extends the length of the spool sleeve 78 and is cylindrical and smooth. A groove 88 extends into the material of the spool sleeve 78 at the inner surface 86. The groove 88 follows a helical path along the inner surface 86. The groove 88 has a profile, when viewed along the groove (FIG. 5), which may be any suitable shape but is preferably rounded. The groove 88 has a greatest depth D1, as measured from the inner surface 86 into the material of the spool sleeve 78.

A notch 90 (FIG. 3) extends into the spool sleeve 78 from the inner surface 86 and from one end face 80. A first end of the groove 88 (FIG. 5) is at the notch 90 and is located a short axial distance into the notch from the one end face 80. A surface 91 of the spool sleeve 78 is immediately adjacent to the first end of the groove 88 within the notch 90. The surface 91 lies in a plane extending parallel to the axis 46. The depth of the notch 90 from the inner surface 86 at the surface 91 is greater than the depth D1 of the groove 88.

The disks 66 (FIG. 3) engage the two end faces 80 of the spool sleeve 78. The disks 66 and the spool sleeve 78 are fixed together with suitable fastener means 92. The fastener means 92 may include staking, separate fasteners or the like. The disks 66 (FIG. 2) support the spool sleeve 78 concentrically about the axis 46 and the spool sleeve encircles the portion 56 of the shaft 50. The disks 66 and the spool sleeve 78 are rotatable together about the axis 46 and are also rotatable together relative to the bushings 70 and the shaft 50.

A cutter 94 of the retractor 10 is made of a suitable material, e.g., steel. In one example the cutter 94 is made by casting and in another example the process for making the cutter includes sintering. The cutter 94 has parallel planar sides 96 (only one shown in FIG. 3) and a cylindrical outer surface 98 which extends axially between the sides 96. The cutter 94 is located within the spool sleeve 78, and the outer surface 98 is at a radius slightly less than the radius of the inner surface 86 of the spool sleeve. Accordingly, the outer surface 98 of the cutter 94 is in close proximity to, but spaced from, the inner surface 86 of the spool sleeve 78.

A cutting element 100 is located on the cutter 94. The material of the cutting element 100 is harder than the material of the spool sleeve 78. In one example the cutting element 100 is made of hardened steel with a hardness of $R_C$ greater than 35 and in another example the cutting element is made of carbide. The cutter 94 and the cutting element 100 are formed together as one piece, or the cutter and cutting element are formed as separate pieces and fixed together, such as by brazing or welding.

Figure 3:
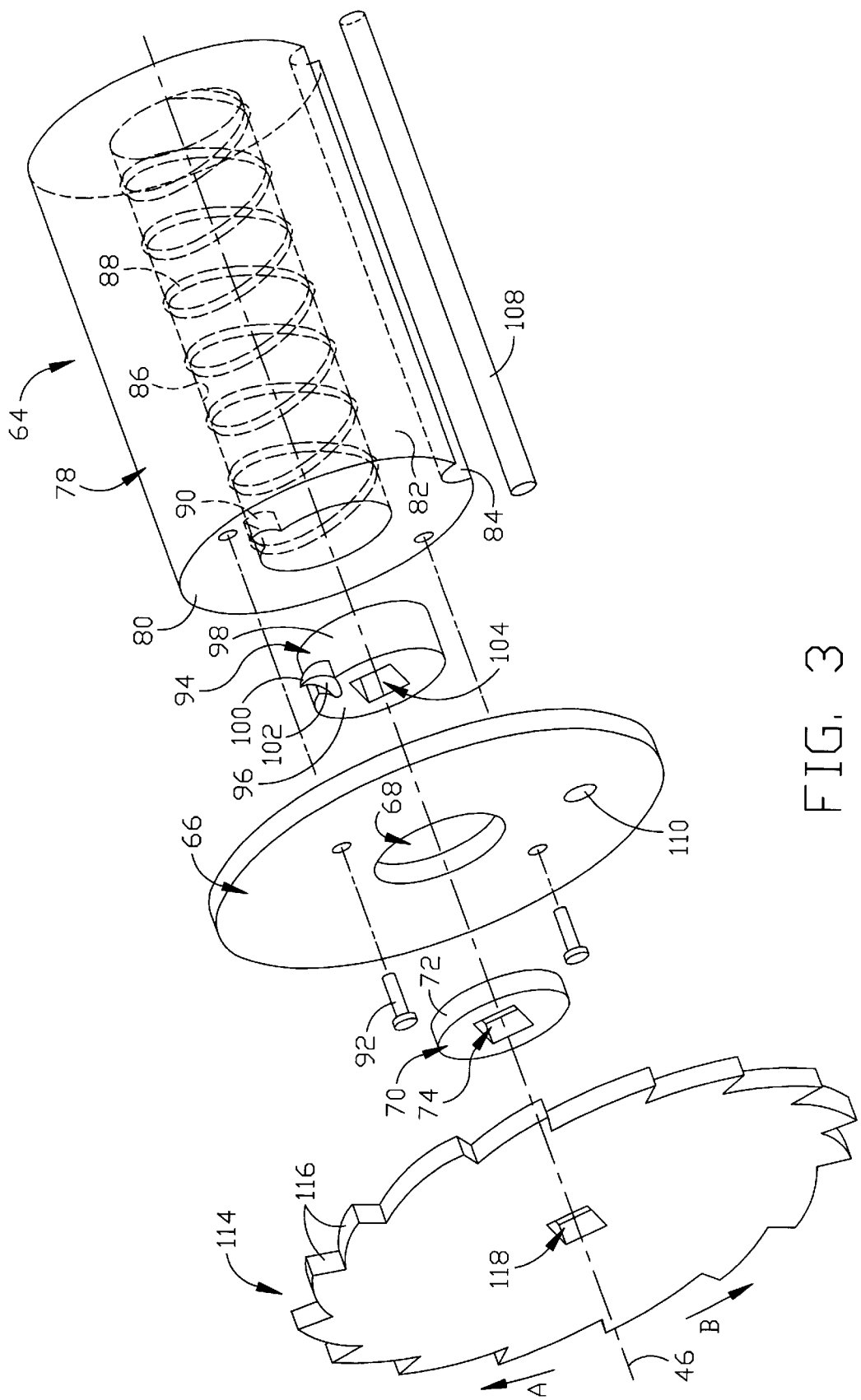
FIG. 3 is an exploded, perspective view of certain parts of the retractor of FIG. 2.

The cutting element 100 protrudes radially from the outer surface 98 (FIG. 5) of the cutter 94. Preferably, the radial height of the cutting element 100 from the outer surface 98 is greater than the depth D1 of the groove 88. The cutting element 100 may have any suitable shape or configuration. As shown in FIG. 3, the cutting element 100 is pointed and sharp, and has a sloped surface 102 which is tapered out to intersect with one of the sides 96 of the cutter 94.

Figure 6:
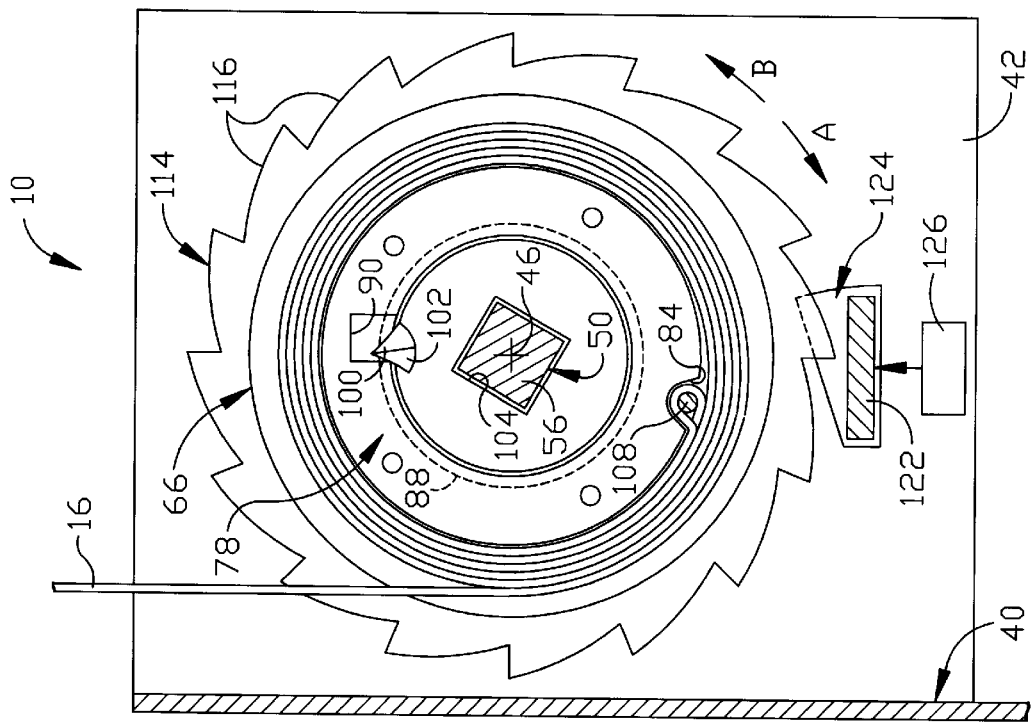
FIG. 6 is a view taken along line 6—6 in FIG. 2.

The cutter 94 has a square center hole 104 centered on the axis 46. If the portion 56 of the shaft 50 had another shape, the center hole would be shaped accordingly. The major and minor radii of the center hole 104 are slightly larger than the major and minor radii of the portion 56 (FIG. 6) of the shaft 50, and the cutter 94 is located on the portion 56 and within the spool sleeve 78. The cutting element 100 is initially located within the notch 90. The sharp/pointed side of the cutting element 100 faces the end of the groove 88.

The slight oversize of the center hole 104 of the cutter 94 permits slight freeplay between the cutter 94 and the shaft 50. The cutter 94 is slidable axially along the shaft 50 because of the slight oversize of the center hole 104. The adjacent disk 66 (FIG. 2) prevents axial movement of the cutter 94 in one direction (toward the left in FIG. 2). The engagement of the cutting element 100 against the spool sleeve 78 at the notch 90 prevents initial axial movement of the cutter 94 in the other direction (toward the right in FIG. 2). Because of the interfit between the center hole 104 and the portion 56 of the shaft 50, the cutter 94 rotates with the shaft.

An end of the webbing 16 (FIG. 6) is sewn into a loop and is located in the groove 84 of the spool sleeve 78. A pin 108 extends through the loop of the webbing 16 along the groove 88. The ends of the pin 108 extend into holes 110 (FIG. 3) on the two disks 66 and the pin 108 is secured relative to the disks 66 by suitable means. Accordingly, removal of the pin 108 from the groove 84 is prevented and the loop end of the webbing 16 (the webbing 16 is not shown in FIG. 3) is retained in the groove 84. The webbing 16 is wrapped around the spool sleeve 78 in successive coils. The spool assembly 64 rotates in withdrawal and retraction directions A and B during webbing withdrawal from, and retraction into, the retractor 10, respectively.

Figure 2:
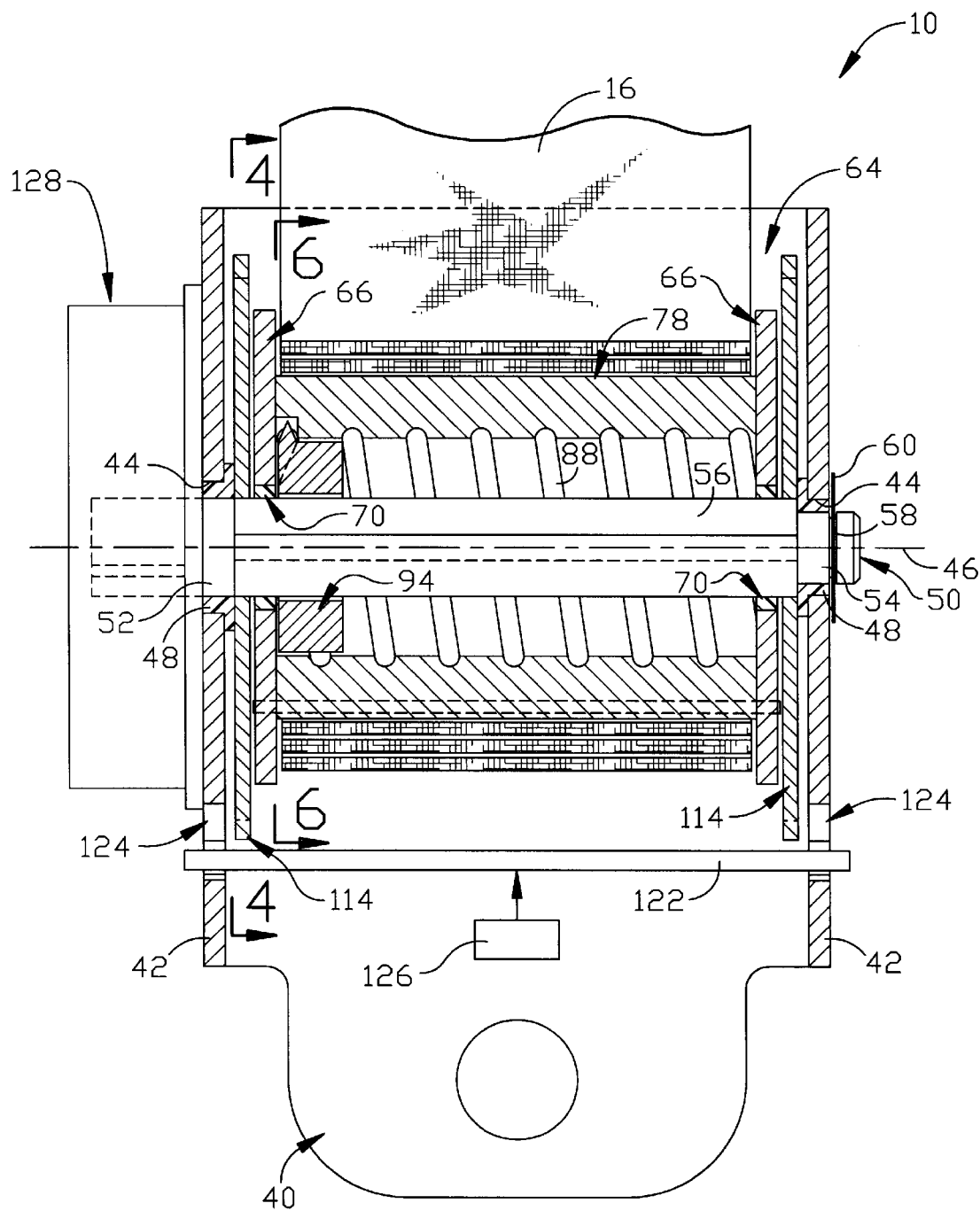
FIG. 2 is an enlarged view, partially in section, of the retractor shown in FIG. 1.

The retractor 10 includes two ratchet wheels 114 (FIG. 2). The ratchet wheels 114 have identical structure and only one of the ratchet wheels 114 is described, with particular reference to FIG. 3. The ratchet wheel 114 (only one shown in FIG. 3) is a flat plate lying perpendicular to the axis 46 and having a plurality of teeth 116. The teeth 116 are arranged in an annular array extending about the outer periphery of the ratchet wheel 114. Each tooth 116 has a radial surface and a sloped intersecting surface. The array of teeth 116 of the ratchet wheel 114 is located at a radial distance from the axis 46 which is greater than the radius of the outer periphery of the disk 66.

The ratchet wheel 114 has a square center hole 118. If the portion 56 of the shaft 50 had another suitable shape, the center hole 118 would be correspondingly shaped. The center hole 118 is centered on the axis 46, and has the same major and minor radii as the portion 56. The portion 56 of the shaft 50 fits snugly in the center holes 118 and the ratchet wheels 114 rotate with the shaft 50. Each ratchet wheel 114 is located on one side of the spool assembly 64, adjacent to a respective one of the disks 66.

Figure 4:
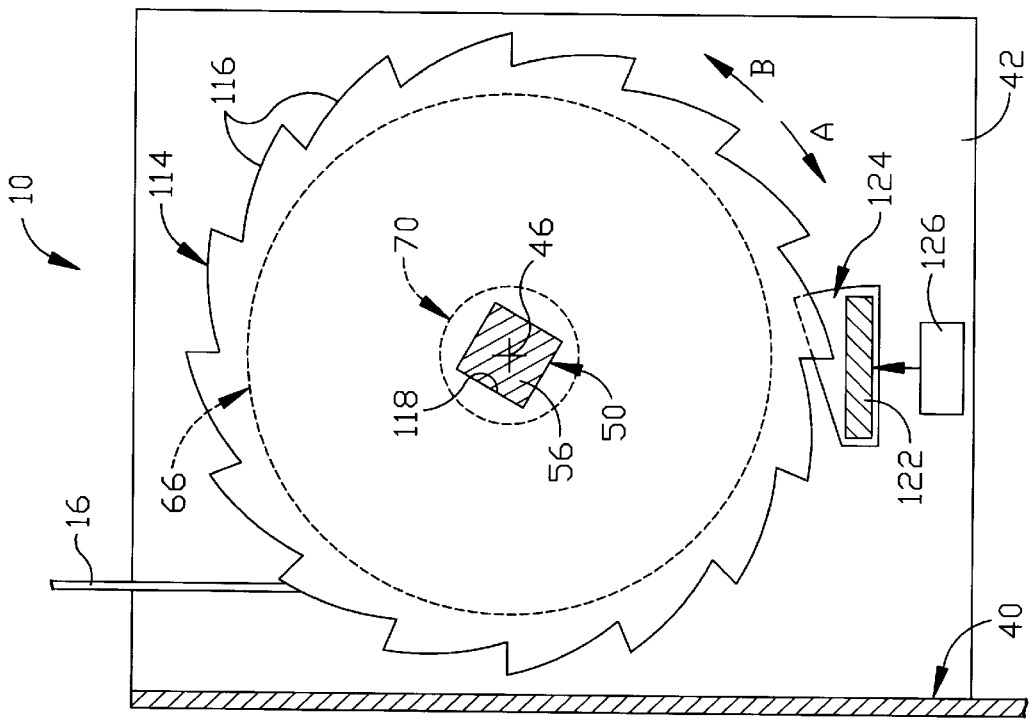
FIG. 4 is a view taken along line 4—4 in FIG. 2.
Figure 7:
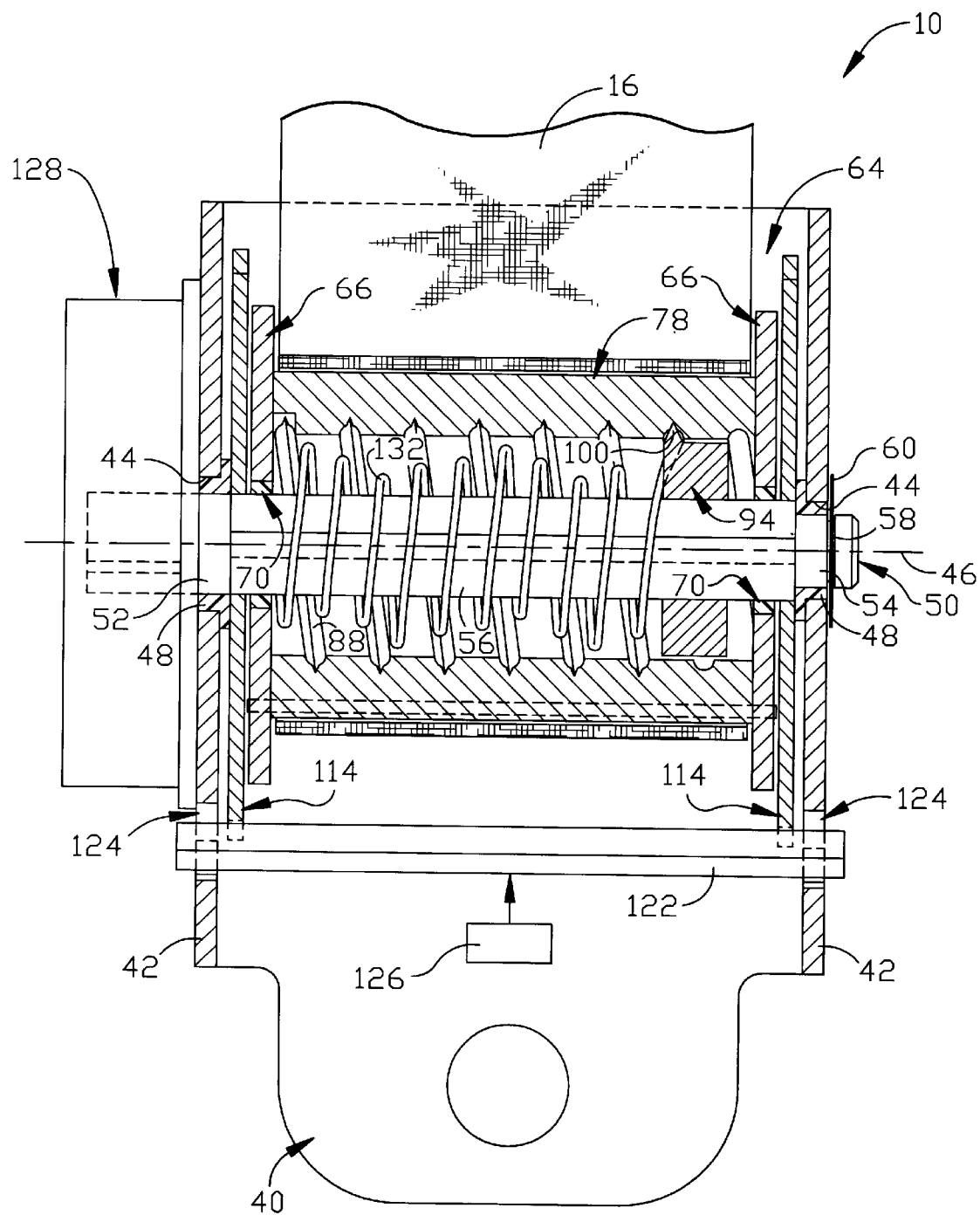
FIG. 7 is a view similar to FIG. 2, but with parts in a different position.

The retractor 10 (FIG. 2) has a suitable device for engaging the ratchet wheels 114 to stop rotation of the ratchet wheels in the webbing withdrawal direction A. Preferably, this mechanism includes a lock pawl 122 which extends across the frame 40, from one side 42 to the other. The lock pawl 122 extends through openings 124 located in each of the two sides 42 of the frame 40. The openings 124 are shaped to permit pivot movement of the lock pawl 122 from a release position (FIG. 2) to a blocking position (FIG. 7 and shown in phantom in FIG. 4). In the blocking position, the lock pawl 122 engages the teeth 116 on the ratchet wheels 114 to stop rotation of the ratchet wheels 114 in the webbing withdrawal direction A. Rotation of the ratchet wheels 114 in the webbing retraction direction B is not prevented by the lock pawl 122 because the sloped surfaces of the teeth 116 cam the lock pawl 122 outward and allow rotation in the webbing retraction direction B.

An actuator 126 for moving the lock pawl 122 from its release position (FIG. 2) to its blocking position (FIG. 7 and in phantom in FIG. 4) may have any suitable construction and is only schematically illustrated. For example, the actuator 126 may be a mechanical device that includes a pendulum 20 or a ball in a cup. The actuator may also be an electromechanical device that includes an electro magnet operated in response to a mechanical sensor or an electronic accelerometer. The actuator 126 moves the lock pawl 122 to its blocking position when it is desirable to restrain the vehicle occupant with the seat belt webbing system 12 (FIG. 1), such as in a vehicle collision. For example, the actuator 126 (FIG. 2) may be constructed to move the lock pawl 122 in response to a sudden vehicle deceleration above a predetermined deceleration which is indicative of a vehicle collision. The actuator 126 could also be constructed to move the lock pawl 122 in response to acceleration of the webbing 16 in the webbing withdrawal direction A above a predetermined acceleration. The predetermined acceleration of the webbing 16 is indicative of a condition which would typically occur during a vehicle collision.

A drive assembly 128 of the retractor 10 is mounted on one side 42 of the frame 40. The drive assembly 128 biases the shaft 50 to rotate in the webbing retraction direction B. The drive assembly 128 may have any suitable construction. For example, the drive assembly 128 may include a flat spring (not shown) and a housing. The spring extends between the housing and one end of the shaft 50.

When the vehicle occupant (not shown) initially pulls the webbing 16 to extend the webbing across the vehicle occupant, the actuator 126 is not in an activated state, the lock pawl 122 is in its release position (FIG. 4), and the ratchet wheels 114 are not blocked against rotation in the webbing withdrawal direction A. The pulling force on the webbing 16 is transferred to the spool assembly 64 such that the spool assembly is rotated in the webbing withdrawal direction A. The disks 66 of the spool assembly 64 urge the bushings 70 to rotate. Because of the resistance to relative rotation between the disks 66 of the spool assembly 64 and the bushings 70, the bushings 70 rotate with the spool assembly.

The cutting element 100 (FIG. 5) bears on the surface 91 of the spool sleeve 78, but does not cut into the spool sleeve. A rotational force is transferred from the spool sleeve 78 to the cutter 94 and the cutter rotates with the spool assembly 64. The shaft 50 (FIG. 2) rotates with the bushings 70 and the cutter 94. Accordingly, the shaft 50 is rotated with the spool assembly 64 in the webbing withdrawal direction A against the bias provided by the drive assembly 128. In addition, because the ratchet wheels 114 are fixed to rotate with the shaft 50, the ratchet wheels 114 are also rotated in the webbing withdrawal direction A.

Similarly, when the vehicle occupant is preparing to exit the vehicle, the tongue assembly 22 (FIG. 1) is released from the buckle 26 and the webbing 16 is slackened. The shaft 50 (FIG. 2) is rotated in the webbing retraction direction B by the drive assembly 128. The ratchet wheels 114, the bushings 70, the cutter 94, and the spool assembly 64 rotate with the shaft 50 in the webbing retraction direction B. The webbing 16 is wound onto the spool sleeve 78.

When it is desirable to restrain the vehicle occupant, such as during a collision, the actuator 126 is activated to move the lock pawl 122 from its release position (FIG. 2) to its blocking position (FIG. 7 and in phantom in FIG. 4). The lock pawl 122 prevents rotation of the ratchet wheels 114 in the webbing withdrawal direction A. Rotation of the shaft 50 in the webbing withdrawal direction A is prevented because of the interfit between the ratchet wheels 114 and the portion 56 of the shaft 50. The bushings 70 and the cutter 94 are stopped with the shaft 50. Rotation of the spool assembly 64 in the webbing withdrawal direction A and withdrawal of the webbing 16 are initially arrested.

If the vehicle occupant moves forward relative to the arrested webbing 16, the vehicle occupant presses against the webbing and increases the tension in the webbing. The tension in the webbing 16 is proportional to the force with which the vehicle occupant presses against the webbing and urges the spool assembly 64 to rotate in the webbing withdrawal direction A. The force imparted to the webbing 16 by the vehicle occupant is proportional to the product of the moving mass of the occupant and the acceleration of the occupant (Newton's Second Law of physics). At the spool assembly 64, the material of the spool sleeve 78 at the notch 90 bears on the sharp edge of the cutting element 100 and the disks 66 tend to slide rotationally about the stationary bushings 70.

If the force urging the spool assembly 64 to rotate in the webbing withdrawal direction A relative to the stationary shaft 50 is below a predetermined force, the spool assembly 64 does not rotate relative to the shaft. Specifically, the cutting element 100 does not penetrate into the material of the spool sleeve 78 at the groove 88 and the disks 66 do not slide about the bushings 70. The retractor 10 does not pay out any additional amount of the webbing 16.

If the force urging the spool assembly 64 to rotate relative to the shaft 50 is above the predetermined force, the spool assembly 64 rotates relative to the shaft in the webbing withdrawal direction A. The cutting element 100 overcomes the resistance of the material of the spool sleeve 78 and penetrates into the material of the spool sleeve at the groove 88. The material of the spool sleeve 78 is cut such that a segment 132 (FIG. 7) is cut away from the rest of the material of the spool sleeve. The segment 132 slides off the cutting element 100 and may coil around the shaft 50. The cutting element 100 follows the groove 88 on the spool sleeve 78 as the spool assembly 64 rotates relative to the shaft 50.

The groove 88 guides the cutter 94 to move axially (toward the right in FIG. 7) along the shaft 50. For each successive revolution of the spool sleeve 78 in the webbing withdrawal direction A, the cutter 94 is moved along the shaft 50 a distance which is equal to the axial length of one helical loop of the groove 88. The cutter 94 may continue to move axially along the shaft 50 and continue to cut the material of the spool sleeve 78 along the groove for the entire length of the groove 88. Preferably, there are several helical loops of the groove 88. The axial movement of the cutter 94 is arrested when the cutter 94 abuts the far disk 66. When the axial movement of the cutter 94 is arrested, further rotation of the spool sleeve 78 of the spool assembly 64 in the webbing withdrawal direction A is prevented.

During the rotation of the spool assembly 64 relative to the shaft 50, an amount of the webbing 16 is uncoiled from the spool assembly 64 under the tension force created in the webbing by the vehicle occupant. The cutting of the material of the spool sleeve 78 is not instantaneous but instead occurs over a period of time because of the resistance to the cutting action. During this time period, the webbing 16 does not fully block forward movement of the vehicle occupant.

Occupant deceleration resulting from engagement with the webbing 16 occurs over a longer period of time than it would if the webbing 62 were connected to a spool sleeve which was prevented from rotating in the webbing withdrawal direction A. The force required to decelerate the vehicle occupant is applied over the longer period of time, reducing the peak restraining force applied to the vehicle occupant.

The principle of conservation of energy states that the total occupant kinetic collision energy is ½ M $(V_i^2-V_f^2)$, where M is the occupant's mass, $V_i$ is the velocity of the vehicle occupant at the beginning of the collision and $V_f$ is the velocity of the vehicle occupant at the end of the collision. The total occupant collision energy is dissipated by performing work on the vehicle occupant. Work, which is a force applied over a distance, is performed on the vehicle occupant to stop his motion. During a vehicle collision, work is performed on a vehicle occupant in a variety of means, including physical absorption by the vehicle occupant, interaction between the vehicle occupant and the vehicle seat, and interaction between the vehicle occupant and the webbing 16. Cutting the spool sleeve 78 results in reapportionment of the work, lower peak loads in the webbing 16, and less loading of the webbing on the vehicle occupant. Some kinetic energy of the moving vehicle occupant is absorbed and dissipated by the cutting of the spool sleeve 78.

Figure 9:
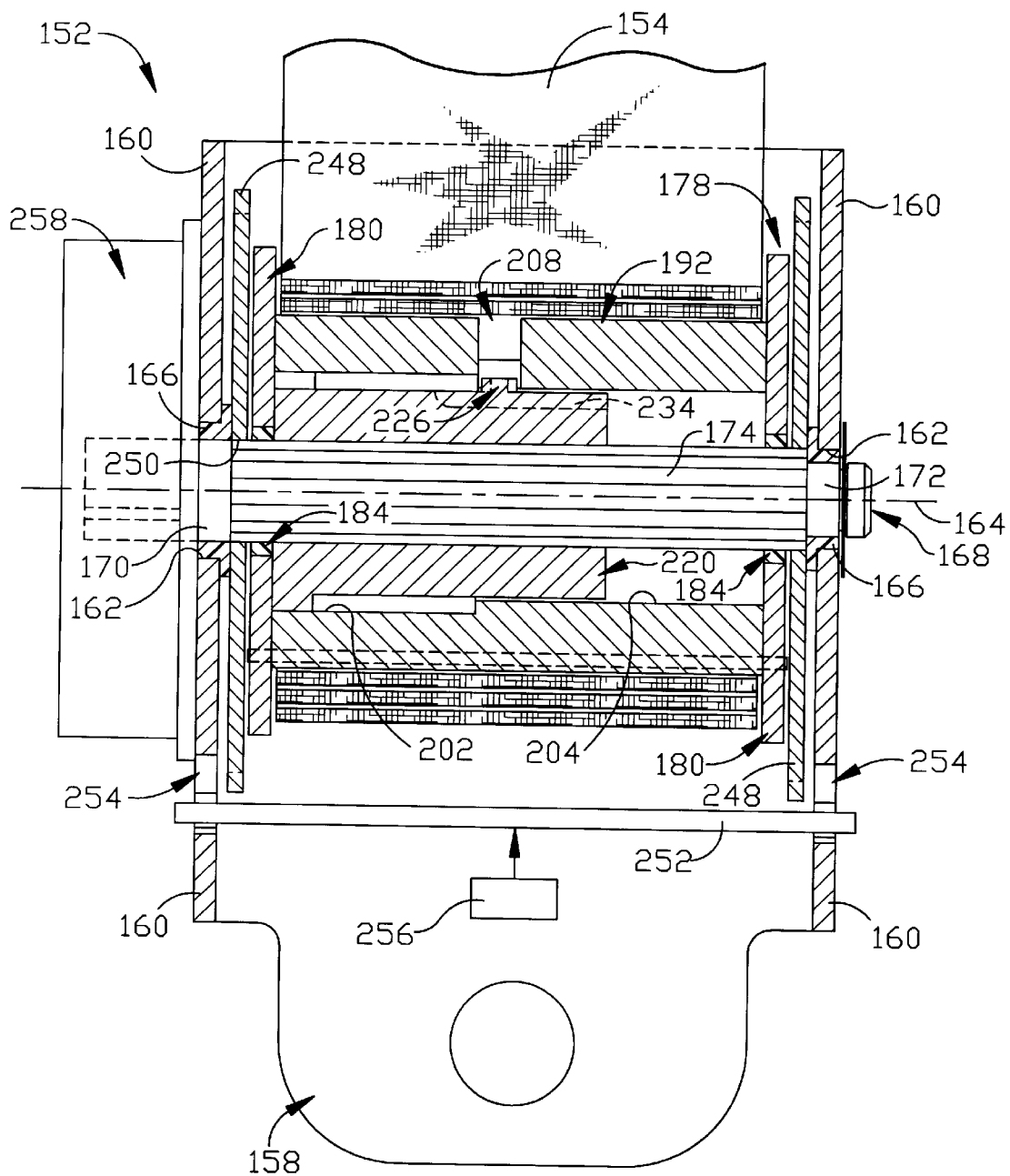
FIG. 9 is a view, partially in section, of a retractor which is a second embodiment of the present invention.

A retractor 152 according to a second embodiment of the present invention is illustrated in FIG. 9. The retractor 152 operates in a manner similar to the retractor 10 (FIG. 2). The retractor 152 (FIG. 9) includes a frame 158, which may be the same as the frame 40 (FIG. 2) of the retractor 10. The frame 158 (FIG. 9) is preferably a U-shaped metal member and has two sides 160 with openings 162. The centers of the openings 162 are aligned along an axis 164. Two bushings 166 are mounted on the frame 158 in the openings 162. The bushings 166 are preferably plastic.

A shaft 168 of the retractor 152 is made of metal or other suitable material. The shaft 168 has cylindrical portions 170 and 172 which are located at opposite ends of the shaft 168. Intermediate the two cylindrical portions 170 and 172 is a portion 174 with external splines extending parallel to the axis 164. The splined portion 174 has major and minor radii, and provides rotational drive surfaces. The portion 174 may have any other suitable shape. For example, the portion 174 may have a square cross-section.

The shaft 168 extends along the axis 164 and the cylindrical portions 170, 172 extend through the bushings 166. A suitable means or mechanism prevents axial movement of the shaft 168 relative to the frame 158. For example, a retainer may be provided in a groove on the shaft 168. The shaft 168 is rotatable about the axis 164 relative to the frame 158.

Figure 10:
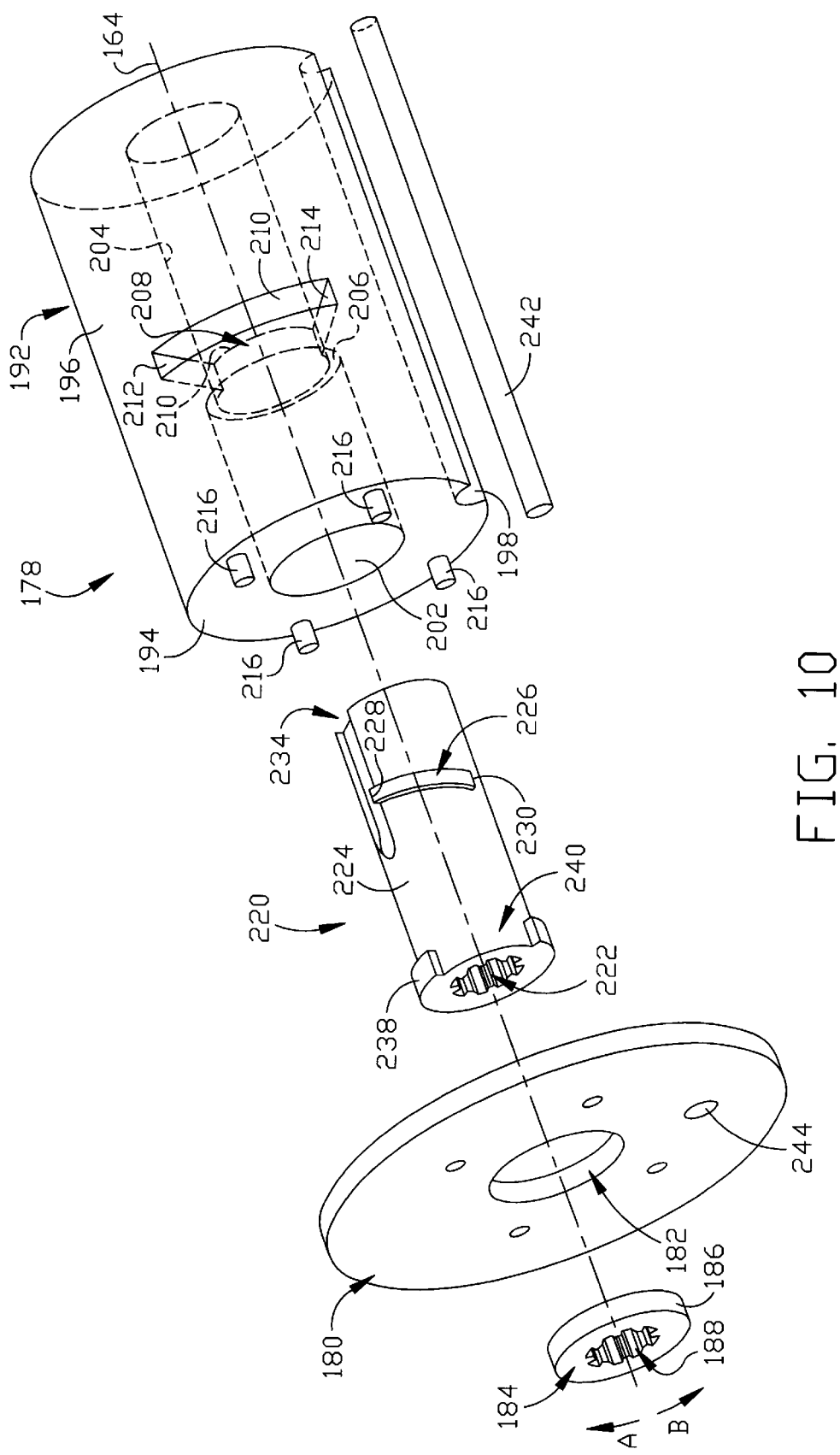
FIG. 10 is an exploded, perspective view of certain parts of the retractor of FIG. 9.

A spool assembly 178 of the retractor 152 includes two disks 180. The disks 180 have the same structural features, and only one of the disks is discussed, with particular reference to FIG. 5. The disk 180 (only one shown in FIG. 10) is made of metal or other suitable material. The disk 180 is a plate lying perpendicular to the axis 164 and has a smooth circular outer periphery. A circular center hole 182 extends through the disk 180 and has a center located on the axis 164. The radius of the center hole 182 is larger than the largest radius of the portion 174 of the shaft 168.

The retractor also includes two bushings 184 (only one shown in FIG. 10) which are identical and only one of which is discussed. The bushing 184 is made of plastic or other suitable material. A circular outer peripheral surface 186 of the bushing 184 has a radius slightly less than the radius of the center hole 182 of the disk 180. A center hole 188 of the bushing 184 is centered on the axis 164. The bushing 184 has internal splines at the center hole 188 which have dimensions slightly greater than the dimensions of the portion 174 (FIG. 9) of the shaft 168 to permit a slip fit between the bushing and the shaft. If the portion 174 of the shaft 168 had another suitable shape, then the center hole 188 would have a corresponding shape.

The bushing 184 fits snugly onto the portion 174 of the shaft 168 for rotation with the shaft. The disk 180 is mounted on the bushing 184 such that the bushing 184 is located within the center hole 182 of the disk. The disk 180 can rotate about the axis 164 relative to the bushing 184 by rotationally sliding on the surface 186 of the bushing. Some resistance to this relative rotation is provided by a suitable means, such as a frictional resistance between the disk 180 and the surface 186 of the bushing 184.

The spool assembly 178 includes a spool sleeve 192. The spool sleeve 192 is preferably made of metal, e.g., brass or aluminum. However, the spool sleeve 192 may be made of any other suitable material, such as plastic. The spool sleeve 192 is a hollow cylinder which is coaxial with on the axis 164. Two end faces 194 (only one identified in FIG. 10) of the spool sleeve 192 are perpendicular to the axis 164.

A cylindrical outer surface 196 of the spool sleeve 192 extends along the length of the spool sleeve between the two end faces 194. A groove 198 extends into the spool sleeve 192 at the outer surface 196. The groove 198 extends the length of the spool sleeve 192 and is parallel to the axis 164. The groove 198 may have any suitable shape and preferably has the shape of a rounded trough.

A first inner surface segment 202 defines a portion of the interior of the spool sleeve 192. The first inner surface segment 202 is cylindrical and is located at a first radius from the axis 164. The first inner surface segment 202 extends in an axial direction along part of the overall length of the spool sleeve 192. Preferably, the first inner surface segment 202 extends approximately half of the overall length of the spool sleeve 192.

A second inner surface segment 204 of the spool sleeve 192 defines another portion of the interior of the spool sleeve. The second inner surface segment 204 is cylindrical and is located at a second radius, which is smaller than the first radius. Accordingly, the second inner surface segment 204 is closer to the axis 164 than the first inner surface segment 202. The second inner surface segment 204 extends from the end of the first inner surface segment 202 to the far end face 194. An annular shoulder 206 is defined within the spool sleeve 192 at the junction between the first and second inner surface segments 202 and 204.

An opening 208 extends radially through the spool sleeve 192 from the outer surface 196 to the hollow interior at the second inner surface segment 204. The opening 208 is at the shoulder 206, e.g., approximately half way along the axial length of the spool sleeve 192. A portion of the shoulder 206 is missing because the opening 208 is at the edge of the shoulder 206. The opening 208 may alternatively be located in the spool sleeve 192 such that the opening 208 also cuts through a portion of the spool sleeve 192 at the first inner surface segment 202.

The opening 208 preferably has a trapezoidal cross-section along its radial extent. The opening 208 is defined by two planar surfaces 210 which are parallel to each other and perpendicular to the axis 164. The surfaces 210 are axially spaced apart and define a width of the opening 208.

Another surface 212 which partially defines the opening 208 is perpendicular to the surfaces 210 and parallel to the axis 164. Preferably, the surface 212 extends along a radial line from the axis 164. A surface 214, which also partially defines the opening 208, is perpendicular to the surfaces 210 and parallel to the axis 164. The surface 214 is spaced an arc length away from the surface 212 and the circumferential length of the opening 208 is measured between the surfaces 212 and 214.

The disks 180 engage the two end faces 194 of the spool sleeve 192. The disks 180 and the spool sleeve 192 are fixed together through suitable fastener means 216, e.g., staking or the like. The disks 180 support the spool sleeve 192 concentrically on the axis 164 about the shaft 168. The disks 180 and the spool sleeve 192 are rotatable together about the axis 164 and are also rotatable together about the axis relative to the bushings 184 and the shaft 168.

The retractor 152 (FIG. 9) includes a cutter 220 which is made of a suitable material, such as cast steel or a sintered metal. A center hole 222 (FIG. 10) extends through the cutter 220 and has a center located on the axis 164. The cutter 220 has internal splines at the center hole 222 which are shaped to mate with the splines of the portion 174 of the shaft 168, but the major and minor radii of the splines of the cutter 220 are larger than those of the portion 174. If the portion 174 of the shaft 168 had another suitable shape, the center hole 222 of the cutter 220 would be correspondingly shaped. The cutter 220 has a cylindrical major outer surface 224. The outer surface 224 is at a radius slightly less than the radius of the second inner surface segment 204 of the spool sleeve 192.

The cutter 220 has a cutting element 226 which is located on the outer surface 224. The cutter 220 and the cutting element 226 are formed together as a single piece, or the cutter and cutting element are formed as separate pieces and fixed together, such as by brazing or welding. Preferably, the material of the cutting element 226 is harder than the material of the spool sleeve 192, e.g., the cutter element is hardened steel or carbide.

The cutting element 226 comprises a body with two end portions 228 and 230. The body of the cutting element 226 protrudes radially from the outer surface 224 of the cutter 220. The body has a width measured in the axial direction and is elongate along a portion of the circumference of the outer surface 224 of the cutter 220. Also, the two end portions 228 and 230 are axially offset with respect to each other. Accordingly, the cutting element 226 extends along a helical segment on the outer surface 224, about and along the axis 164. The pitch of the helix along which the helical segment lies is such that the helix typically has 8–10 turns around the axis 164 per inch. It is to be understood that another helix pitch may be used.

The end portion 228 of the cutting element 226 is sharp. Preferably, the end portion 228 has a cutting edge which is located at the radially outermost extent of the end portion 228. Also, the end portion 228 is preferably slightly undercut at the cutting edge to create a back angle which encourages a digging action of the end portion 228.

A slot 234 is located in the cutter 220. The slot 234 is a recess in the cutter 220 radially below the outer surface 224. The slot 234 is located immediately adjacent to the end portion 228 of the cutting element 226. The slot 234 has a suitable radial depth, circumferential width, and axial length so that material cut by the cutting element 226 is received in the slot. Preferably, the slot 234 extends along a segment of the cutter 220 from one axial end of the cutter.

The cutter 220 has a shoulder 238. The shoulder 238 is located at an end of the cutter 220 opposite to the end at which the slot 234 is located. The shoulder 238 projects radially out past the outer surface 224. The shoulder 238 itself has a smooth outer cylindrical surface. This outer cylindrical surface is located at a radius slightly less than the radius of the first inner surface segment 202 of the spool sleeve 192. The shoulder 238 has a suitable axial length to guide movement of the cutter 220 and to stop the cutter 220 at the end of the cutter movement.

Preferably, the shoulder 238 does not extend completely around the circumference of the cutter 220. A semi-annular gap 240 is defined between the two arc ends of the shoulder 238. The circumferential extent of the gap 240 is slightly greater than the circumferential extent of the cutting element 226. The gap 240 is axially aligned with the cutting element 226 and is provided for ease of manufacture of the cutter 220. Specifically, the gap 240 permits a push-pull press operation for forming the cutting element 226 as a single piece with the cutter 220. The cutter 220 and the cutting element 226 may be made of sintered metal by a known process.

Figure 11:
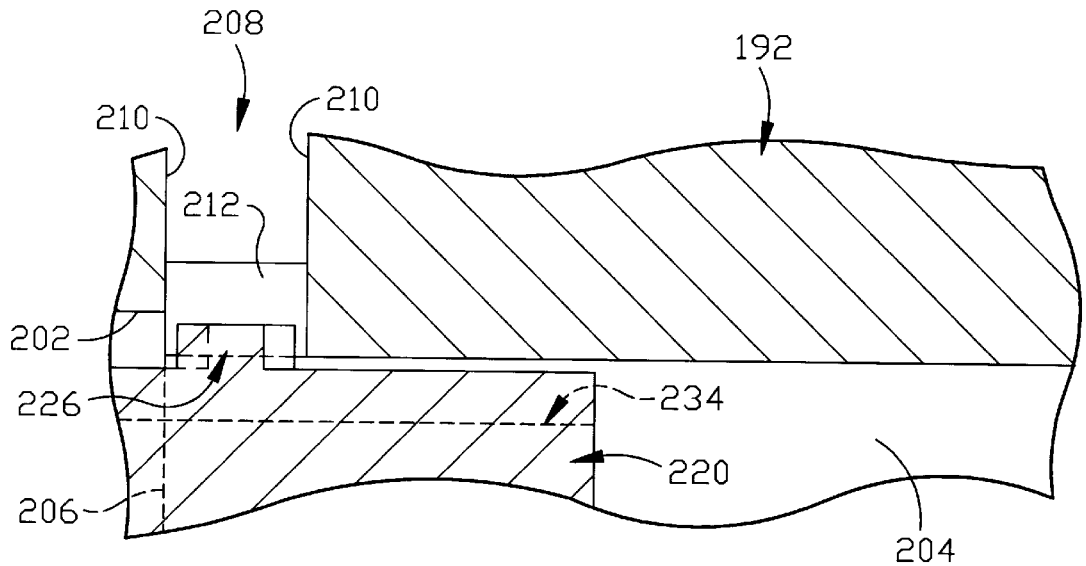
FIG. 11 is an enlarged portion of FIG. 9.

The cutter 220 is located on the portion 174 (FIG. 9) of the shaft 168 and is located within the spool sleeve 192. The shoulder 238 (FIG. 10) is located within the portion of the spool sleeve interior defined by the first inner surface segment 202. The shoulder 238 is located at the end of the first inner surface segment 202 adjacent to a first open end of the spool sleeve 192 (the leftmost end in FIG. 9). A portion of the cutter 220 (FIG. 11) extends into the spool sleeve interior defined by the second inner surface segment 204 of the spool sleeve 192. The cutting element 226 is located at the opening 208. The sharp end portion 228 faces a portion of the surface 212 on the spool sleeve 192.

The splines at the center hole 222 (FIG. 10) of the cutter 220 engage the portion 174 (FIG. 9) to constrain the cutter for rotation with the shaft 168. The slight oversize of the center hole 222 allows for axial movement of the cutter 220 along the shaft 168. The adjacent disk 180 (leftmost in FIG. 9) prevents axial movement of the cutter 220 in one direction (toward the left in FIG. 9). Engagement of the cutting element 226 against the spool sleeve 192 at the opening prevents initial axial movement of the cutter 220 in the other axial direction (toward the right in FIG. 9).

A pin 242 (FIG. 10) extends along the groove 198. The pin 242 may be made of any suitable material such as steel. The ends of the pin 242 extend into holes 244 on the disks 180 and are fixed relative to the disks 180. Accordingly, the pin 242 is prevented from moving out of the groove 198.

An end of the webbing 154 is sewn into a loop (not shown) and is located in the groove 198 in the spool sleeve 192. The pin 242 extends through the loop and holds the end of the webbing. The webbing 154 is wrapped around the spool sleeve 192 in successive coils. The spool assembly 178 is rotatable in webbing withdrawal and retraction directions A and B during webbing withdrawal and webbing retraction, respectively, from the retractor 152.

The retractor 152 (FIG. 9) includes two ratchet wheels 248. The ratchet wheels 248 have the same structural features and only one of the ratchet wheels is described. The ratchet wheel 248 is a flat plate lying perpendicular to the axis 164, and has a plurality of teeth located in an annular array about the outer periphery of the ratchet wheel. Each tooth has a radial surface and a sloped intersecting surface. The annular array of teeth is located at a radius of the axis 164 which is greater than the radial distance to the outer periphery of the disks 180. The ratchet wheel 248 has a center hole 250 which has a center located on the axis 164. The ratchet wheel 248 has splines at the center hole 250 with major and minor radii equal to the radii of the portion 174 of the shaft 168.

Each ratchet wheel 248 is located on the portion 174 of the shaft 168 and adjacent to a respective one of the disks 180. The ratchet wheels 248 are fixed relative to the shaft 168 via the interfit of the surfaces defining the center hole 250 and the portion 174 of the shaft. Accordingly, the ratchet wheels 248 rotate with the shaft 168. Also, because the spool assembly 178 is rotatable relative to the shaft 168, the spool assembly is rotatable relative to the ratchet wheels 248.

The retractor 152 includes a suitable mechanism for stopping rotation of the ratchet wheels 248 in the webbing withdrawal direction A. Preferably, this mechanism includes a lock pawl 252. The lock pawl 252 may be identical to the lock pawl 122 (FIG. 2) of the first embodiment. The lock pawl 252 (FIG. 9) extends across the frame 158 and is supported in openings 254 in the sides 160. The openings 254 permit pivoting of the lock pawl 252 from a release position (shown in FIG. 9) to a blocking position (not shown) in which the lock pawl 252 engages teeth of the ratchet wheels 248 to block rotation of the ratchet wheels in the webbing withdrawal direction A. The sloped surfaces of the teeth can cam the lock pawl 252 to permit rotation of the ratchet wheels 248 in the webbing retraction direction B when the lock pawl 252 is in engagement with the ratchet wheels.

The retractor 152 includes an actuator 256 for moving the lock pawl 252 from its release position to its blocking position. The actuator 256 may have any suitable construction to cause movement of the lock pawl to its blocking position when it is desirable to restrain the vehicle occupant with the webbing 154, similar to the first embodiment. A drive assembly 258 of the retractor 152 is mounted on one side of the frame 158. The drive assembly 258 may have any suitable construction to bias the shaft 168 in the webbing retraction direction B, and may be identical to the drive assembly 128 (FIG. 2) of the first embodiment.

When the vehicle occupant initially pulls the webbing 154 (FIG. 9) to extend the webbing across the vehicle occupant, the actuator 256 is not activated and the lock pawl 252 is in its release position. The pulling force in the webbing 154 is transmitted to the spool sleeve 192 of the spool assembly 178 and causes the spool assembly 178 to rotate in the webbing withdrawal direction A. Because the spool sleeve 192 and the disks 180 are fixed together within the spool assembly 178, the disks 180 rotate with the spool sleeve. A rotational force is transmitted to the bushings 184 from the disks 180. Because of the resistance to relative rotation between the disks 180 and the bushings 184, the bushings rotate with the disks.

The cutting element 226 (FIG. 11) bears on the surface 212 of the spool sleeve 192, but does not cut into the spool sleeve. The surface 212 of the spool sleeve 192 pushes on the cutting element 226 and causes the cutter 220 to rotate with the spool sleeve. Accordingly, the shaft 168 and the ratchet wheels 248 are rotated with the spool assembly 178 in the webbing withdrawal direction A against the bias applied to the shaft by the drive assembly 258.

Similarly, when the vehicle occupant is preparing to exit the vehicle and the webbing 154 is released from across the vehicle occupant, the spool assembly 178, the bushings 184, the cutter 220, the shaft 168, and the ratchet wheels 248 rotate as a unit in the webbing retraction direction B. There is no significant relative rotation between any of these rotating elements of the retractor 152 because there is no force causing relative rotation.

When it is desirable to restrain the vehicle occupant, e.g., during a vehicle collision as discussed above with regard to the first embodiment, the actuator 256 moves the lock pawl 252 to its blocking position engaging the ratchet wheels 248. Rotation of the ratchet wheels 248 in the webbing withdrawal direction A is arrested. Because the ratchet wheels 248 are fixed with the shaft 168, rotation of the shaft in the webbing withdrawal direction A is also arrested. The bushings 184 and the cutter 220 are also stopped with the shaft 168. Rotation of the spool assembly 178 in the webbing withdrawal direction A and withdrawal of the webbing are also arrested.

During the collision, when the vehicle occupant moves forward due to inertia, the vehicle occupant presses against the webbing 154 and increases the tension in the webbing 154. The force imparted to the webbing 154 by the vehicle occupant is proportional to the product of the moving mass of the occupant and the acceleration of the occupant (Newton's Second Law of Physics). The tension force in the webbing 154 is transmitted to the spool assembly 178 and urges the spool assembly to rotate in the webbing withdrawal direction A. The disks 180 are urged to slide rotationally on the bushings 184, which are held stationary by the shaft 168. Also, the spool sleeve 192 is urged to rotate relative to the cutter 220, which is held rotationally stationary by the shaft 168. When the spool sleeve 192 is urged to rotate relative to the cutter 220, the surface 212 on the spool sleeve bears against the sharp end portion 228 on the cutter.

If the force urging the spool assembly 178 to rotate relative to the stationary shaft 168 is below a predetermined force, the sharp end portion 228 of the cutting element 226 does not penetrate into the material of the spool sleeve 192 at the surface 212. Accordingly, the spool sleeve 192 does not rotate relative to the stationary cutter 220 and the shaft 168. The spool assembly 178 is held stationary and no further amount of webbing 154 is pulled from the retractor 152.

If the force urging the spool sleeve 192 to rotate relative to the cutter 220 is above the predetermined force, the sharp end portion 228 on the cutting element 226 overcomes the resistance of the material of the spool sleeve 192 and penetrates into the material of the spool sleeve at the surface 212. The spool assembly 178 rotates relative to the shaft 168 and a further amount of webbing 154 is pulled from the retractor 152.

Figure 12:
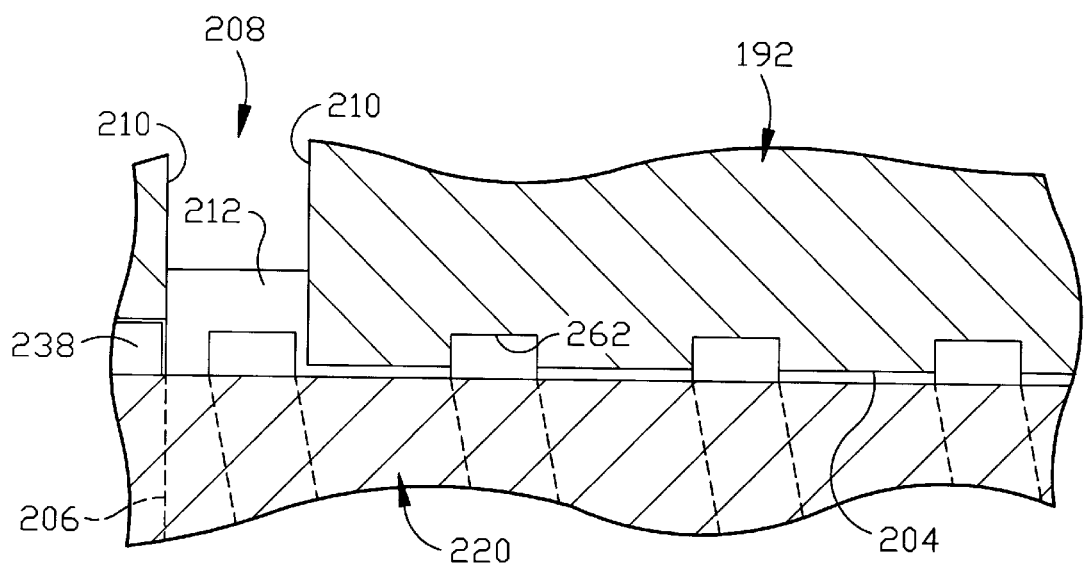
FIG. 12 is a view similar to FIG. 11, but with parts in a different position.

During the rotation of the spool assembly 178 relative to the stationary shaft 168, the cutting element 226 cuts a segment of material away from the rest of spool sleeve 192 to create a groove 262 (FIG. 12). The helical shape of the cutting element 226 causes the cutter 220 to move axially along the shaft 168 as the spool sleeve 192 rotates relative to the rotationally stationary cutter 220. Each rotation of the spool sleeve 192 causes the cutter 220 to move axially sufficiently far such that the cutting element 226 cuts material of the spool sleeve at a location spaced away from the previous location of cutting. Accordingly, the groove 262 which is cut into the spool sleeve 192 has a helical shape. The axial movement of the cutter 220 and the rotation of the spool sleeve 192 is permitted until the shoulder 238 abuts against the shoulder 206 within the spool sleeve 192. During cutting, the material which is cut away is received within the slot 234.

Energy is absorbed during cutting of the spool sleeve 192 by the cutter 220. Also, the cutting is not instantaneous, but occurs over a period of time. Accordingly, similar to the first embodiment, the work to decelerate on the vehicle occupant is reapportioned.

Figure 13:
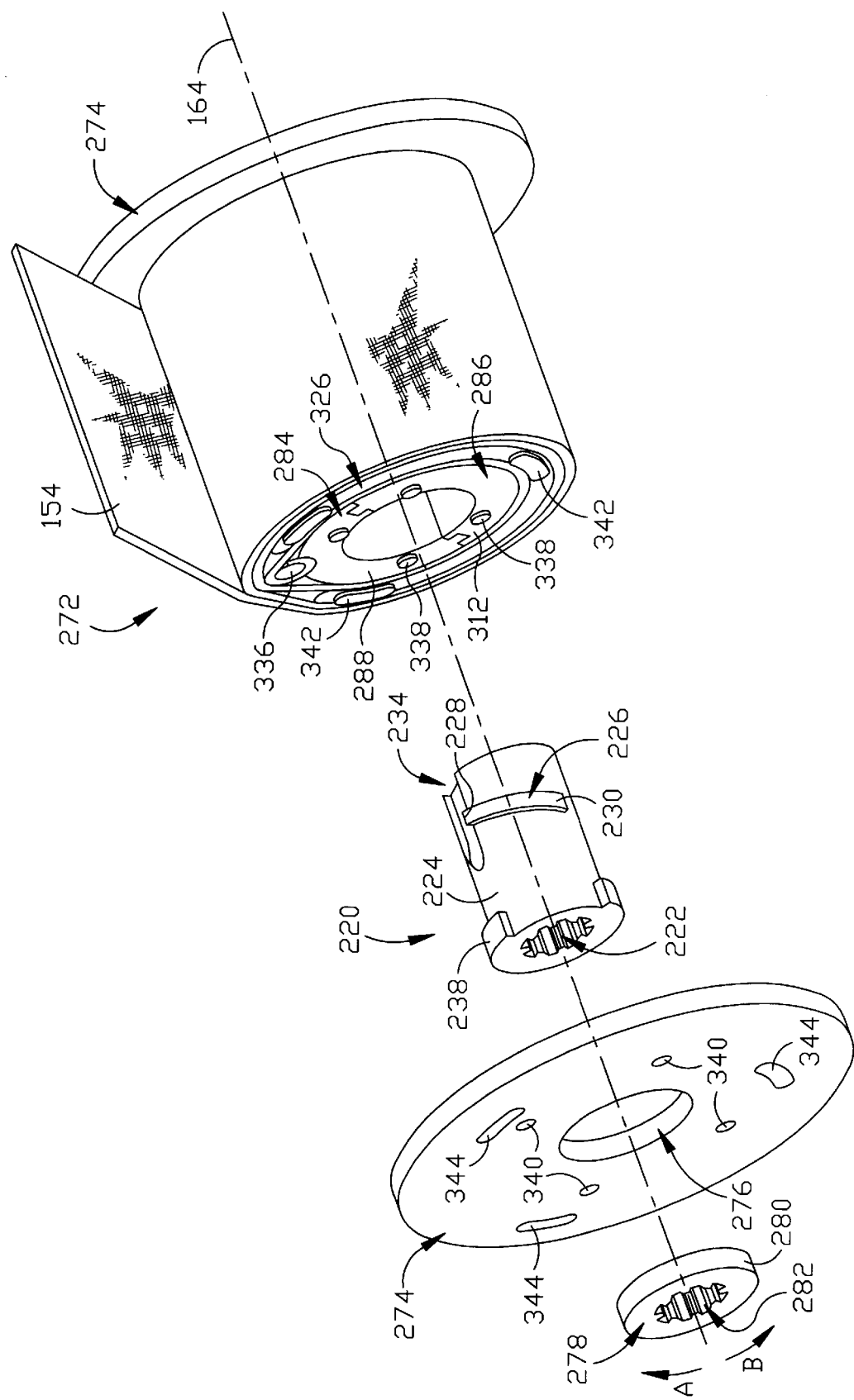
FIG. 13 is an exploded, perspective view of certain parts of a third embodiment of the present invention.

A portion of a third embodiment according to the present invention is illustrated in FIG. 13. The third embodiment is similar to the second embodiment (FIG. 9) and only the spool assemblies are different. The structural aspects of the third embodiment could also be used in the first embodiment (FIG. 1).

A spool assembly 272 (FIG. 13) of the third embodiment may be substituted for the spool assembly 178 (FIG. 10) in the second embodiment. Accordingly, only the spool assembly 272 (FIG. 13) and some associated structure are shown in FIG. 13. The structure within the retractor (FIG. 9) of the second embodiment which is unchanged is referenced to using the same reference numerals used in the description of the second embodiment.

The spool assembly 272 (FIG. 13) includes two disks 274 which have identical structural features, and only one of the disks is discussed. The disk 274 is made of metal, but could be made of other suitable material. The disk 274 is a flat plate lying perpendicular to the axis 164, and has a smooth radially outer periphery and a circular center hole 276. The center hole 276 is centered on the axis 164 and has a radius which is larger than the largest radius of the portion 174 of the shaft 168 (not shown in FIG. 13, see FIG. 9).

The retractor also includes two bushings 278 (only one shown in FIG. 13) which are identical and only one of which is shown and discussed. The bushing 278 is made of plastic. However, other suitable material could be used. The bushing 278 has a circular outer peripheral surface 280 which has the same radius as the center hole 276 in the disk 274. A center hole 282 of the bushing 278 extends through the bushing and has a center on the axis 164. The center hole 282 is the same shape as the portion 174 of the shaft 168 (see FIG. 9), and the portion 174 fits snugly into the bushing 278 so that the bushing is fixed for rotation with the shaft.

The disk 274 (FIG. 13) is mounted on the outer surface 280 of the bushing 278. The disk 274 can rotate about the axis 164 relative to the bushing 278. Some resistance to this relative rotation is present. For example, a frictional resistance to the relative rotation may exist.

Figure 14:
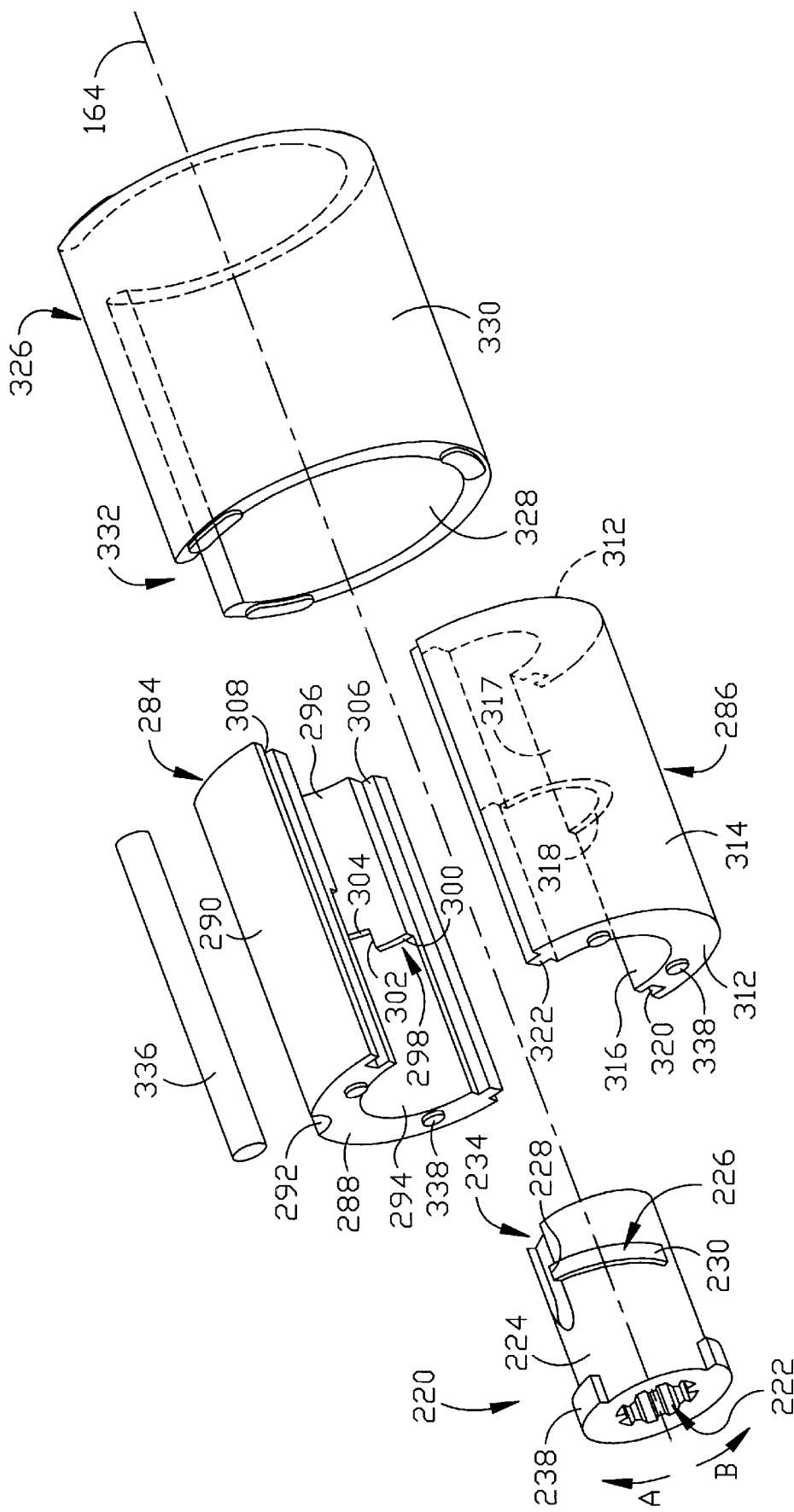
FIG. 14 is an exploded, perspective view of some of the parts shown in FIG. 13.

The spool assembly 272 includes two spool sleeve halves 284 and 286 (FIG. 14). The spool sleeve halves 284, 286 are preferably metal, e.g., brass or aluminum, but could be made of other suitable material such as plastic. The spool sleeve halves 284, 286 may be molded, casted machined or otherwise processed.

The first spool sleeve half 284 has a hollow half cylinder shape and extends partially around the axis 164. Two end faces 288 (only one shown) are on the opposite axial ends of the first spool sleeve half 284 and are perpendicular to the axis 164. An outer surface 290 of the first spool sleeve half 284 extends between the two end faces 288. A groove 292 extends radially into the first spool sleeve half 284 at the outer surface 290, and along the length of the outer surface parallel to the axis 164.

A first inner surface segment 294 is located on a radially inner side of the first spool sleeve half 284. The first inner surface segment 294 is curved about the axis 164 at a first radius, and extends in the axial direction from a first one of the end faces 288 for a portion of the overall axial length of the first spool sleeve half 284, e.g., approximately half way. The radius of the first inner surface segment 294 of the first spool sleeve half 284 is the same as the radius of the first inner surface segment 202 (FIG. 10) of the spool sleeve 192 in the second embodiment.

A second inner surface segment 296 (FIG. 14) of the first spool sleeve half 284 is curved about the axis 164 at a second radius, which is less than the first radius and the same as the radius of the second inner surface segment 204 (FIG. 10) of the spool sleeve 192 in the second embodiment. The second inner surface segment 296 (FIG. 14) extends in the axial direction from the end of the first inner surface segment 294 to the second end face 288.

A shoulder 298 is located at a junction between the first and second inner surface segments 294 and 296. The junction is defined by surfaces 300, 302 and 304 which extend between the first and second inner surface segments 294 and 296. The surface 300 lies in a plane perpendicular to the axis 164 and located a distance from the first end face 288. The surface 300 extends in an arc about the axis 164 from a first longitudinal side of the first spool sleeve half 284 and has an end at a location spaced from the first longitudinal side of the first spool sleeve half.

The surface 304 lies in a plane perpendicular to the axis 164 and axially offset from the surface 300 in a direction away from the first end face 288. The surface 304 extends in an arc about the axis 164 from a second longitudinal side of the first spool sleeve half 284 and has an end located near the end of the surface 300. The surface 302 lies in a plane parallel to the axis 164 and extends between the ends of the surfaces 300 and 304.

A projection 306 is raised on the first longitudinal side of the first spool sleeve half 284 and extends the length of the first spool sleeve half, parallel to the axis 164. The projection 306 may have any suitable shape. The second longitudinal side of the first spool sleeve half 284 has a groove 308 which extends the length of the first spool sleeve half, parallel to the axis 164. The groove 308 may have any suitable shape.

The second spool sleeve half 286 has a hollow half cylinder shape and extends partially around the axis 164. Two end faces 312 (one visible and one in phantom in FIG. 14) are on opposite axial ends of the second spool sleeve half 286 and are perpendicular to the axis 164. The axial length of the second spool sleeve half 286, as measured between the end faces 312, is the same as the axial length of the first spool sleeve half 284, as measured between the end faces 288.

An outer surface 314 of the second spool sleeve half 286 extends between the end faces 312. A first inner surface segment 316 of the second spool sleeve half 286 is curved about the axis 164 at the same radius as the first inner surface segment 294 of the first spool sleeve half 284. The first inner surface segment 316 extends in the axial direction from the first end face 312 the same distance as between the first end face 288 and the surface 300 of the first spool sleeve half 284.

A second inner surface segment 317 (shown in phantom) of the second spool sleeve half 286 is curved about the axis 164 at the same radius as the second inner surface segment 296 of the first spool sleeve half 284, and extends in the axial direction from the end of the first inner surface segment 316 to the second end face 312. A shoulder 318 (shown in phantom) is defined by a surface extending between the first and second surface segments 316 and 317. The surface defining the shoulder 318 is coplanar with the surface 300 on the first spool sleeve half 284, and extends in an arc about the axis 164 from one longitudinal side of the second spool sleeve half 286 to the other. Alternatively, the second spool sleeve half 286 may be identical to the first spool sleeve half 284. The shoulder 318 would be defined by surfaces which perpendicularly intersect identical to the intersection of surfaces 300, 302 and 304 of the first spool sleeve half 284.

The first longitudinal side of the second spool sleeve half 286 has a groove 320 extending the length of the second spool sleeve half 286, parallel to the axis 164. The shape of the groove 320 corresponds to the shape of the projection 306 on the first spool sleeve half 284. A projection 322 is raised on the second longitudinal side of the second spool sleeve half 286, and extends the length of the second spool sleeve half 286 parallel to the axis 164. The shape of the projection corresponds to the shape of the groove 308 in the first spool sleeve half 284.

The spool sleeve halves 284, 286 engage each other so that the two halves form a hollow cylinder concentric on the axis 164. The projection 322 on the second spool sleeve half 286 is located in the groove 308 on the first spool sleeve half 284, and the projection 306 on the first spool sleeve half 284 is located in the groove 320 on the second spool sleeve half 286.

A collar 326 of the spool assembly 272 is made of metal, e.g., rolled steel, or other suitable material. The collar 326 is a hollow C-shaped cylinder with inner and outer surfaces 328 and 330 concentric about the axis 164. The inner surface 328 is at a radius which is slightly greater than the radius of the outer surfaces 290 and 314 of the spool sleeve halves 284, 286, respectively. The axial length of the collar 326 is approximately equal to the axial length of the spool sleeve halves 284, 286. A gap 332 extends along the axial length of the collar 326, parallel to the axis 164, and is a passage into the interior of the collar.

A pin 336 extends along the groove 292 of the first spool sleeve half 284, and is made of any suitable material such as steel. The length of the pin 336 is approximately equal to the axial length of the first spool sleeve half 284. An end of the webbing 154 (FIG. 13) is sewn into a loop and is located within the groove 292. The pin 336 is located within the loop in the groove 292.

The webbing 154 is wrapped once around the spool sleeve halves 284, 286, and the collar 326 extends around the single wrap of webbing and the spool sleeve halves 284, 286. The groove 292 of the first spool sleeve half 284 and the pin 336 within the groove 292 are located at the gap 332, and the webbing 154 extends out from the interior of the collar 326 at the gap. The webbing 154 is wrapped in successive coils around the collar 326.

The disks 274 engage the end faces 288 and 312 of the first and second spool sleeve halves 284 and 286, respectively, and also engage axial ends of the collar 326. The spool sleeve halves 284, 286 are fixed to the disks 274 by suitable fastener means, e.g., staking elements 338 (schematically shown) on the spool sleeve halves 284, 286 projecting through holes 340 in the disks 274. The position of the spool sleeve halves 284, 286 is indexed to the disks 274 by the location of the holes 340 in the disks 274. The collar 326 is also indexed and fixed in position relative to the disks 274 by suitable means, e.g., projections 342 on the collar extending into holes 344 on the disks 274. Accordingly, the entire spool assembly 272 is held together and the elements of the spool assembly are indexed and fixed relative to each other.

The disks 274 support the assembly of the spool sleeve halves 284, 286, the collar 326, and the wound webbing 154 concentric about the axis 164. The disks 274, the spool sleeve halves 284, 286, and the collar 326 are rotatable together about the axis 164 and are also rotatable relative to the bushings 278 and the shaft 168 (see the second embodiment, FIG. 9). The spool assembly 272 (FIG. 13) is rotatable in the webbing withdrawal and retraction directions A and B during webbing withdrawal and retraction, respectively.

The cutter of the third embodiment is the same as the cutter 220 of the second embodiment (see FIGS. 9 and 10) and the same reference numbers are used. The cutter 220 is located on the portion 174 of the shaft 168 and is located within the hollow defined by the spool sleeve halves 284, 286. The shoulder 238 of the cutter 220 is located at one side (left as viewed in FIGS. 13 and 14) of the hollow defined by the spool sleeve halves 284, 286 and is adjacent to one (the left one) of the disks 274.

The cutting element 226 of the cutter 220 is adjacent to the surface 304 (FIG. 14) on the first spool sleeve half 284. The sharp end portion 228 of the cutting element 226 faces the surface 302. The other end portion 230 of the cutting element 226 faces a portion of the longitudinal side of the second spool sleeve half 286 adjacent and transverse to the shoulder 318. The surface 304 prevents axial movement of the cutter 220. The surface 302 resists relative rotation between the cutter 220 and the spool assembly 272. Accordingly, the cutter 220 is initially held relative to the spool assembly 272. The third embodiment eliminates the need for the opening 208 (FIG. 10) in the spool sleeve 192 of the second embodiment.

Like the second embodiment (FIG. 9), when the vehicle occupant initially pulls the webbing 154 to extend the webbing across the vehicle occupant, the actuator 256 is not activated and the lock pawl 252 does not block rotation of the ratchet wheels 248. The pulling force in the webbing 154 (FIG. 13) rotates the spool assembly 272 in the webbing withdrawal direction A. Rotational force is transferred to the bushings 278 by the disks 274, and through the bushings 278 to the shaft 168 because of the resistance to relative rotation between the bushings and the disks.

The cutting element 226 bears on the surface 302 of the first spool sleeve half 284, but does not cut into the first spool sleeve half. The surface 302 pushes the cutting element 226 and causes the cutter 220 to rotate. Accordingly, the shaft 168 and the ratchet wheels 248 are rotated with the spool assembly 272 against the bias applied to the shaft by the drive assembly 258. Similarly, when the vehicle occupant is preparing to exit the vehicle, the webbing is released and the shaft 168, the ratchet wheels 248 and the spool assembly 272 rotate together in the webbing retraction direction B, and there is no relative rotation between these parts.

When it is desirable to restraint the vehicle occupant, such as during a vehicle collision, the actuator 256 moves the lock pawl 252 into engagement with the ratchet wheels 248. Accordingly, withdrawal direction rotation of the shaft 168, the bushings 278 and the cutter 220 is arrested. The spool assembly 272 is initially held stationary, and the vehicle occupant pressing on the webbing 154 causes an increased tension in the webbing. The tension in the webbing 154 urges the spool assembly 272 to rotate in the webbing withdrawal direction A.

If the force urging rotation of the spool assembly 272 relative to the now stationary cutter 220 is below a predetermined force, the cutting element 226 does not penetrate into the material of the first spool sleeve half 284 and the spool assembly 272 does not rotate relative to the stationary cutter 220. If the force urging rotation of the spool assembly 272 in the webbing withdrawal direction A relative to the rotationally stationary cutter 220 is greater than the predetermined force, the cutting element 226 penetrates into and cuts the material of the first spool sleeve half 284 at the surface 302. The cutting element 226 cuts a segment of material away from the first spool sleeve half 284 and directs the cut material into the slot 234.

As the spool sleeve halves 284, 286 are rotated relative to the cutter 220, the cutting element passes from the first spool sleeve half 284 to the second spool sleeve half 286 as if the spool sleeve halves formed a single spool sleeve, similar to the second embodiment. Accordingly, a groove is created in the spool sleeve halves 284, 286 which extends from the first spool sleeve half to the other and back to the first spool sleeve half, in a continuing cycle.

The helical shape of the cutting element 226 causes the groove to be a helical shape, as in the second embodiment. Also similar to the second embodiment, the helical shape causes the cutter 220 to move axially relative to the spool assembly 272. Each relative rotation of the spool assembly 272 results in the cutter 220 being moved over sufficiently far such that the cutter cuts a new section of the spool sleeve halves 284, 286. The cutting by, and the axial movement of, the cutter 220 continues until the shoulder 238 abuts the shoulders 298 and 318 of the spool sleeve halves 284, 286. As in the second embodiment, energy is absorbed during the cutting, and the vehicle occupant is permitted to move forward while energy is absorbed.

Figure 15:
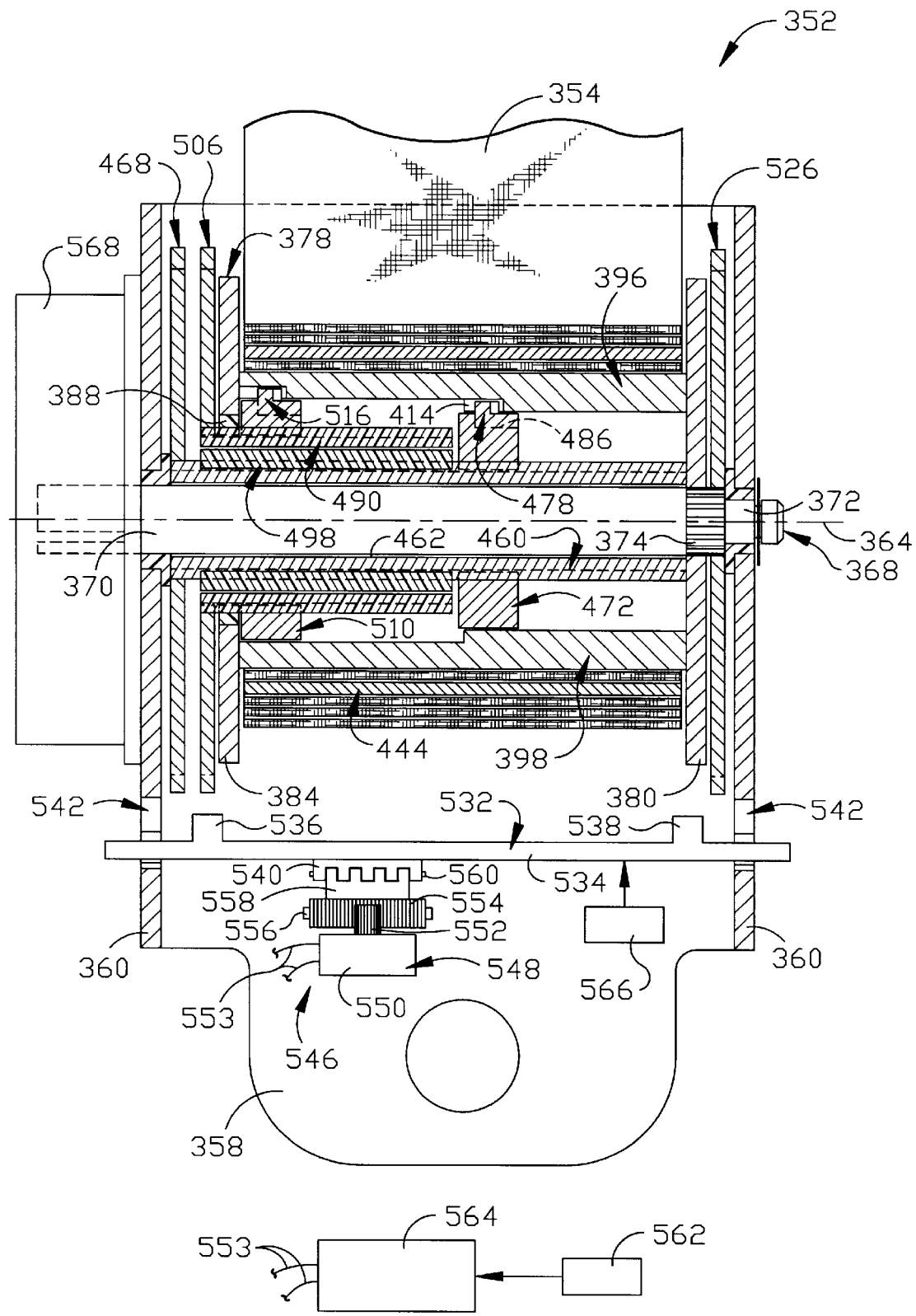
FIG. 15 is a view, partially in section, of a retractor which is a fourth embodiment of the present invention.

A retractor 352, according to a fourth embodiment of the present invention is illustrated in FIG. 15. The retractor 352 has a frame 358 which is preferably made of metal but may be made of other suitable material. The frame 358 is U-shaped with two sides 360 and is fixed to the vehicle body 18 (FIG. 1) by suitable fastener means (not shown). Like the first embodiment (FIG. 2), the sides 360 (FIG. 15) have openings with bushings.

A shaft 368 of the retractor 352 is made of metal or other suitable material, and is elongate along an axis 364. The shaft 368 has cylindrical portions 370 and 372, and a splined portion 374, located intermediate the cylindrical portions 370 and 372. The cylindrical portion 372 is located at one end of the shaft 368, and the cylindrical portion 370 is located at the other end of the shaft and continues along a majority of the length of the shaft. The shaft 368 extends across the frame 358 of the retractor and is supported for rotation about the axis 364. A suitable means prevents axial movement of the shaft 368 relative to the frame 358. For example, the means for preventing axial movement may includes a retainer located within a groove on the shaft 368.

The retractor 352 has a spool assembly 378. A disk 380 of the spool assembly 378 is a flat plate lying perpendicular to the axis 364, and is made of metal or other suitable material. The disk 380 has a smooth, circular radially outer periphery and a center hole with a center located on the axis 364. The disk 380 has internal splines at the center hole with major and minor radii equal to those of the portion 374 of the shaft 368. The disk 380 is located on the portion 374 of the shaft 368, and the disk 380 is fixed for rotation with the shaft.

The spool assembly 378 has another disk 384 which is a plate made of metal or other suitable material. The disk 384 has a smooth radially outer periphery and a circular center hole with a center located on the axis 364. A bushing 388 is made of plastic or other suitable material. A circular outer peripheral surface of the bushing 388 has a radius which is slightly larger than the radius of the center hole in the disk 384. The disk 384 is mounted on the bushing 388. The disk 384 can rotate about the axis 364 relative to the bushing 388 by rotationally sliding on the outer surface on the bushing. Some resistance to the relative rotation between the disk 384 and the bushing 388 is present. For example, frictional resistance may exist between the engaging surfaces.

Figure 16:
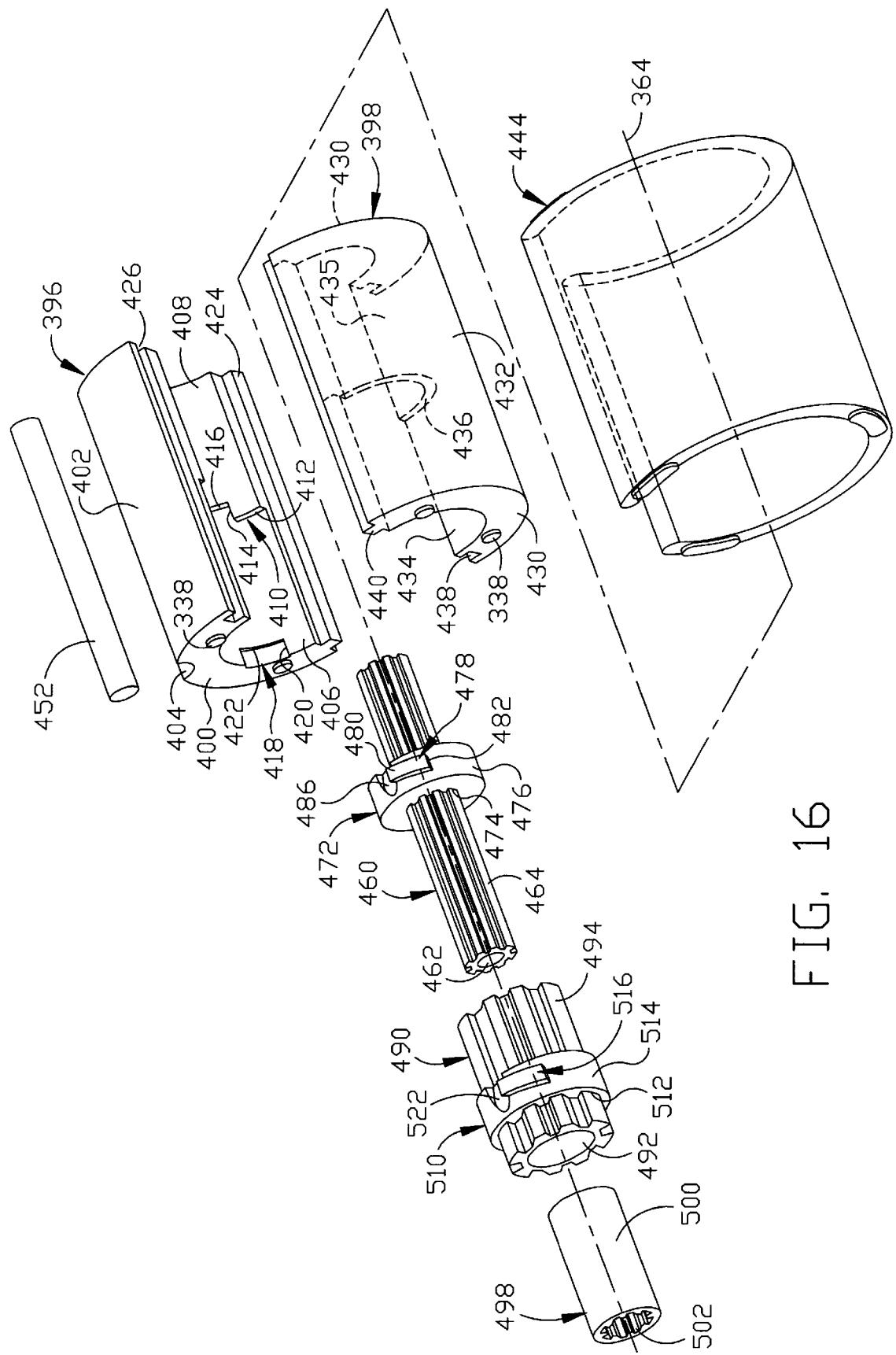
FIG. 16 is an exploded, perspective view of certain parts of the retractor of FIG. 15.

The spool assembly 378 includes two spool sleeve halves 396 and 398 (FIG. 16). The spool sleeve halves 396, 398 are preferably made of metal, such as brass or aluminum. However, other suitable material may be used, such as plastic. The first spool sleeve half 396 has a hollow half cylinder shape and extends about the axis 364. Two end faces 400 (only one shown) are at the opposite ends of the first spool sleeve half 396 and are perpendicular to the axis 364. An arcuate outer surface 402 extends between the end faces 400. A groove 404 is located in the first spool sleeve half 396 at the outer surface 402. The groove 404 extends the length of the first spool sleeve half 396 and is parallel to the axis 364.

The first spool sleeve half 396 has a first inner surface segment 406 which is curved about the axis 364 at a first radius. The first inner surface segment 406 extends from a first one of the end faces 400 (leftmost as viewed in FIG. 16) and along approximately half of the overall axial length of the first spool sleeve half 396. A second inner surface segment 408 of the first spool sleeve half 396 is curved about the axis 364 at a second radius, which is less than the first radius. The second inner surface segment 408 extends along the rest of the axial length of the first spool sleeve half 396.

A shoulder 410 is located at a junction between the first and second inner surface segments 406 and 408. The junction is defined by surfaces 412, 414 and 416 which extend between the first and second inner surface segments 406 and 408. The surface 412 lies in a plane perpendicular to the axis 364 and located a predetermined distance from the first end face 400. The surface 412 extends in an arc about the axis 364 from a first longitudinal side of the first spool sleeve half 396 and has an end at a location spaced from the first longitudinal side of the first spool sleeve half.

The surface 416 lies in a plane perpendicular to the axis 364 and axially offset from the surface 412 in a direction away from the first end face 400. The surface 416 extends in an arc about the axis 364 from a second longitudinal side of the first spool sleeve half 396 and has an end located near the end of the surface 412. The surface 414 lies in a plane parallel to the axis 364 and extends between the ends of the surfaces 412 and 416.

A notch 418 extends into the first spool sleeve half 396 at the radially inner edge of the first end face 400. The notch 418 is partially defined by a surface 420 extending axially from the first end face 400 and lying in a plane parallel to the axis 364, and a surface 422 extending from an end of the surface 420 and lying in a plane perpendicular to the axis.

A projection 424 is raised on the first longitudinal side of the first spool sleeve half 396 and extends the length of the first spool sleeve half, parallel to the axis 364. The second longitudinal side of the first spool sleeve half 396 has a groove 426 which extends the length of the first spool sleeve half 396, parallel to the axis 364.

The second spool sleeve half 398 has a hollow half cylinder shape and extends about the axis 364. Two end faces 430 (one visible and one in phantom in FIG. 16) are parallel to each other and perpendicular to the axis 364. The axial length of the second spool sleeve half 398, as measured between the end faces 430, is the same as the axial length of the first spool sleeve half 396 as measured between its end faces 400.

A semi-cylindrical outer surface 432 extends between the end faces 430. A first inner surface segment 434 of the second spool sleeve half 398 is curved about the axis 364 at the same radius as the first inner surface segment 406 of the first spool sleeve half 396. The first inner surface segment 434 extends along the inner side of the second spool sleeve half 398 the same distance as between the first end face 400 and the surface 412 on the first spool sleeve half 396. A second inner surface segment 435 (shown in phantom) of the second spool sleeve half 398 is curved about the axis 364 at the same radius as the second inner surface segment 408 of the first spool sleeve half 396, and extends in the axial direction from the end of the first inner surface segment 434 to the second end face 430. A shoulder 436 (shown in phantom) is defined by a surface extending between the first and second inner surface segments 434 and 435. The surface defining the shoulder 436 is coplanar with the surface 412 on the first spool sleeve half 396. Alternatively, the second spool sleeve half 398 may be identical to the first spool sleeve half 396. The shoulder 436 would be defined by surfaces which perpendicularly intersect identical to the intersection of surfaces 412, 414 and 416 of the first spool sleeve half 396.

A groove 438 extends along the first longitudinal side of the second spool sleeve half 398, and a projection 440 extends along the second longitudinal side. The spool sleeve halves 396, 398 engage each other to define a hollow cylinder, as in the third embodiment (FIG. 13). A collar 444 (FIG. 16) and a pin 452 of the spool assembly 378 have the same structure and function as the collar 326 and the pin 336 of the third embodiment (FIG. 14). The lengths of the collar 444 (FIG. 16) and the pin 452 are the same as the lengths of the spool sleeve halves 396, 398.

The disks 380 and 384 (FIG. 15) engage the end faces 400 and 430 of the spool sleeve halves 396, 398 and the ends of the collar 444. The spool sleeve halves 396, 398 and the collar 444 are fixed to the disks 380 and 384 by suitable fastener means, such as in the third embodiment (FIG. 13). The disks 380 and 384 (FIG. 15) support the assembly of the spool sleeve halves 396, 398, the collar 444 and coils of webbing 354 concentrically about the axis 364. Because the disk 380 is fixed for rotation with the shaft 368, the spool sleeve halves 396, 398 and the collar 444 rotate with the shaft. Also, because the disk 384 is rotatable relative to the bushing 388, the spool sleeve halves 396, 398 and the collar 444 are rotatable relative to the bushing 388.

A rigid tube shaft 460 of the retractor 352 is made of a suitable material such as metal. The tube shaft 460 has a smooth cylindrical inner surface 462 (FIG. 16) with a radius slightly larger than the radius of the cylindrical portion 370 of the shaft 368. An outer surface 464 of the tube shaft 460 is splined along the length of the tube shaft and has major and minor radii. Other shapes such as square could be used.

The tube shaft 460 is concentric with the axis 364 about the cylindrical portion 370 (FIG. 15) of the shaft 368. A majority of the tube shaft 460 is inside the spool assembly 378, and the end of the tube shaft 460 located within the spool assembly is adjacent to or abuts the disk 380. The tube shaft 460 extends from the spool assembly 378 through the center hole of the bushing 388. A relatively large clearance exists between the tube shaft 460 and the bushing 388. The end of the tube shaft 460 outside of the spool assembly 378 is located adjacent to one side 360 of the frame 358.

A ratchet wheel 468 of the retractor 352 is similar to the ratchet wheels of the second embodiment (FIG. 9), with a plurality of teeth arranged in an annular array around its outer periphery. The ratchet wheel 468 (FIG. 15) has a center hole which has a center located on the axis 364. The ratchet wheel 468 has internal splines at its center hole, with major and minor radii equal to those of the tube shaft 460. The ratchet wheel 468 is mated with the tube shaft 460, and the ratchet wheel is fixed on the end portion of the tube shaft located adjacent to the side 360 of the frame 358.

A cutter 472 (FIG. 16) is made of a suitable material such as hardened steel. The cutter 472 may be made of the same material and may be made by a similar process as the cutter 220 (FIGS. 10 and 13) of the second and third embodiments. The cutter 472 (FIG. 16) is an annular member that has a center hole 474 with its center on the axis 364. The cutter 472 has internal splines at the center hole 474 which are congruent in shape with the outer surface 464 of the tube shaft 460, but which have major and minor radii slightly greater than those of the tube shaft 460.

The cutter 472 has a cylindrical major outer surface 476 which is concentric about the axis 364. The radius of the outer surface 476 is slightly less than the radius of the second inner surface segments 408 and 435 of the first and second spool sleeve halves 396 and 398, respectively. Accordingly, the outer surface 476 is in relatively close proximity to the inner surfaces of the spool sleeve halves 396, 398.

A cutting element 478 is located on the cutter 472. The cutting element 478 and the cutter 472 are formed together as one piece, or are formed as two pieces and fixed together. The material of the cutting element 478 is harder than the material of the spool sleeve halves 396, 398. For example, the cutting element 478 may be hardened steel or carbide. The cutting element 478 has a body with two end portions 480 and 482. The body of the cutting element 478 protrudes radially from the surface 476, has a width measured in the axial direction and has a cross-sectional area coplanar with the axis 364. The body of the cutting element 478 is elongate along a portion of the surface 476 and extends about a portion of the circumference of the cutter 472. Also, the two end portions 480 and 482 are axially offset from each other. Accordingly, the cutting element 478 extends along a helical segment in a direction about and along the axis 364.

The end portion 480 is sharp. Preferably, the end portion 480 has a cutting edge at its radially outermost extent and is slightly undercut at this cutting edge. Accordingly, a back angle is defined at the end portion 480 to encourage a digging action of the end portion 480.

A slot 486 is located in the cutter 472. The slot 486 is a recess in the cutter 472 radially below the surface 476. The slot 486 is located immediately adjacent to the end portion 480 of the cutting element 478. The slot 486 has a suitable radial depth, circumferential width and axial length so that material cut by the cutting element 226 is received in the slot.

The tube shaft 460 extends through the center hole 474 of the cutter 472. Because the splines in the cutter 472 at the center hole 474 correspond in shape to the outer surface 464 of the tube shaft 460, the cutter 472 is constrained for rotation with the tube shaft. The slight oversize of the center hole 474 relative to the outer surface 464 of the tube shaft 460 permits axial movement of the cutter 472 along the tube shaft 460. The cutter 472 is inside the spool assembly 378. The cutting element 478 is adjacent to the surface 416 on the first spool sleeve half 396. The sharp end portion 480 faces the surface 414.

The retractor 352 includes another rigid tube shaft 490 which is also made of a suitable material such as steel. An inner surface 492 of the tube shaft 490 is smooth and cylindrical, and has a radius larger than the greatest radius of the tube shaft 460. The tube shaft 490 has an outer surface 494 which is splined along the length of the tube shaft. Major and minor radii of the surface 494 are equal to the radii of the center hole of the bushing 388.

A bushing 498 is made of suitable material such as plastic. An outer surface 500 of the bushing 498 is smooth and cylindrical. The surface 500 has a radius slightly less than the radius of the inner surface 492 of the tube shaft 490. An inner surface 502 of the bushing 498 is splined along the length of the bushing, and has major and minor radii equal to the major and minor radii of the outer surface 464 of the tube shaft 460.

The bushing 498 is located within the tube shaft 490 and both are located concentrically about the tube shaft 460. The inner surface 502 of the bushing 498 mates with the outer surface 464 of the tube shaft 460 so that the bushing 498 is fixed to rotate with the tube shaft 460. The tube shaft 490 can rotate relative to the bushing 498 by sliding on the outer surface 500 of the bushing 498.

A majority of the tube shaft 490 is inside the spool assembly 378 (FIG. 15). One end of the tube shaft 490 is adjacent to the shoulders 410 and 436 (FIG. 16) on the first and second spool sleeve halves 396 and 398, respectively. A portion of the tube shaft 490 extends out from the spool assembly 378 (FIG. 15) through the bushing 388. The outer surface 494 of the tube shaft 490 mates with the inner surface of the bushing 388, and the bushing 388 rotates with the tube shaft 490.

The retractor 352 includes a ratchet wheel 506 which is similar to the ratchet wheel 468, with a plurality of teeth arranged in an annular array about its outer periphery. A center hole of the ratchet wheel 506 has a center on the axis 364. The ratchet wheel 506 has internal splines at its center hole, with major and minor radii equal to those of the tube shaft 490. The ratchet wheel 506 is mated with the tube shaft 490, and is fixed on the end of the tube shaft 490. The ratchet wheel 506 is located between the ratchet wheel 468 and the disk 384.

A cutter 510 is made of a suitable material such as hardened steel. The cutter 510 is similar to the cutter 472, e.g. the cutter 510 has similar parts and is made by the same process from the same materials. The cutter 510 (FIG. 16) has internal splines at its center hole 512 congruent in shape with the outer surface 494 of the tube shaft 490, but which have major and minor radii slightly greater than those of the tube shaft 490. A major outer surface 514 of the cutter 510 is cylindrical and has a radius slightly less than the radius of the first inner surface segments 406 and 434 of the spool sleeve halves 396, 398.

A cutting element 516 is located on the cutter 510 and has the same structural features as the cutting element 478 on the cutter 472. The body of the cutting element 516 protrudes radially from the surface 514, has a width measured in the axial direction and has a cross-sectional area coplanar with the axis 364. The cross-sectional area of the cutting element 516 is larger than the cross-sectional area of the cutting element 478 of the cutter 472. Specifically, the radial height of the cutting element 516 from the surface 514 may be greater than the radial height of the cutting element 478 from the surface 476. The axial width of the cutting element 516 may also be greater than the axial width of the cutting element 478. A slot 522 is located on the cutter 510 and may have the same shape as the slot 486 on the cutter 472.

The tube shaft 490 extends through the center hole of the cutter 510, and the engagement between the internal splines of the cutter and the outer surface 494 of the tube shaft 490 constrains the cutter 510 for rotation with the tube shaft 490. The slight oversize of the center hole 474 relative to the outer surface 494 of the tube shaft 490 permits axial movement of the cutter along the tube shaft 490. The cutter 510 is inside the spool assembly 378 (FIG. 15). The cutting element 516 is in the notch 418 (FIG. 16) and adjacent to the surface 422. The sharp end portion of the cutting element 516 faces the surface 420 on the first spool sleeve half 396.

The disk 384 (FIG. 15) prevents axial movement of the cutter 510 along the tube shaft 490 in a first direction (to the left in FIG. 15) and the surface 422 of the first spool sleeve half 396 prevents axial movement in the other direction. The surface 420 resists rotation of the cutter 510 relative to the spool sleeve halves 396, 398.

A third ratchet wheel 526 is similar to the ratchet wheels 468 and 506, with an annular array of teeth about its outer periphery. A center hole of the ratchet wheel 526 has a center located on the axis 364. The ratchet wheel 526 has internal splines at its center hole, with major and minor radii equal to those of the portion 374 of the shaft 368. The ratchet wheel 526 is mated with the portion 374, and is fixed on the portion 374.

The retractor 352 has a lock pawl 532. A body 334 of the lock pawl 532 is elongate in a direction generally parallel to the axis 364. The body 534 may have any suitable shape, for example, a flat plate. Two projections 536 and 538 extend from one longitudinal side of the body 534. A connection fixture 540 is located on the other longitudinal side of the body 534. The lock pawl 532 extends across the frame 358 and through openings 542 in the two sides 360 of the frame 358. The openings 542 permit pivoting of the lock pawl 532 and also permits sliding of the lock pawl 532 parallel to the axis 364.

A shuttle mechanism 546 is provided in the retractor 352 for moving the lock pawl 532 parallel to the axis 364, and has any suitable construction. For example, the shuttle mechanism 546 has a rotary driver 548 with a housing 550 fixed to the frame 358. A pinion gear 552 has an annular array of teeth and is rotated by the rotary driver 548. The rotary driver 548 is controlled via electrical leads 553 to rotate the pinion gear 552 in either of two directions.

A rack 554 has a linear array of teeth and is supported on a guide 556 fixed relative to the housing 550. The rack 554 can slide linearly parallel to the axis 364 along the guide 556. The pinion gear 552 meshes with the rack 554. When the pinion gear 552 is rotated, the rack 554 is moved linearly, in a direction dependent upon the direction of rotation of the pinion gear.

A connection fixture 558 is mounted on the rack 554. The connection fixture 558 mates with the connection fixture 540 on the lock pawl 532, and a connection member 560 interconnects the two connection fixtures 540 and 558 to permit pivoting of the lock pawl 532 relative to the shuttle mechanism 546. Preferably, the connection fixtures 540 and 558 are two halves of a hinge, and the connection member 560 is a hinge pin.

A sensor 562 (schematically shown, FIG. 15) detects a characteristic of the vehicle occupant seated in the seat 14. The characteristic may be the weight of the vehicle occupant or the proximity of the vehicle occupant relative to structure of the vehicle, such as the windshield. Also, the sensor 562 could detect characteristics of the vehicle or characteristics of a collision in which the vehicle is involved. For example, U.S. Pat. No. 5,216,607, assigned to TRW Vehicle Safety Systems Inc., discloses a method and apparatus for sensing a vehicle collision using energy and velocity as measures of collision violence. An example of a characteristic of the vehicle is the speed of the vehicle at the beginning of the collision. Plural sensors could be used to detect plural characteristic of the vehicle occupant and/or the vehicle and/or a collision. The sensor 562 provides a signal indicative of the detected characteristic to a controller 564 (schematically illustrated). The controller 564 operates the rotary driver 548 of the shuttle mechanism 546 in response to the signal.

Figure 17:
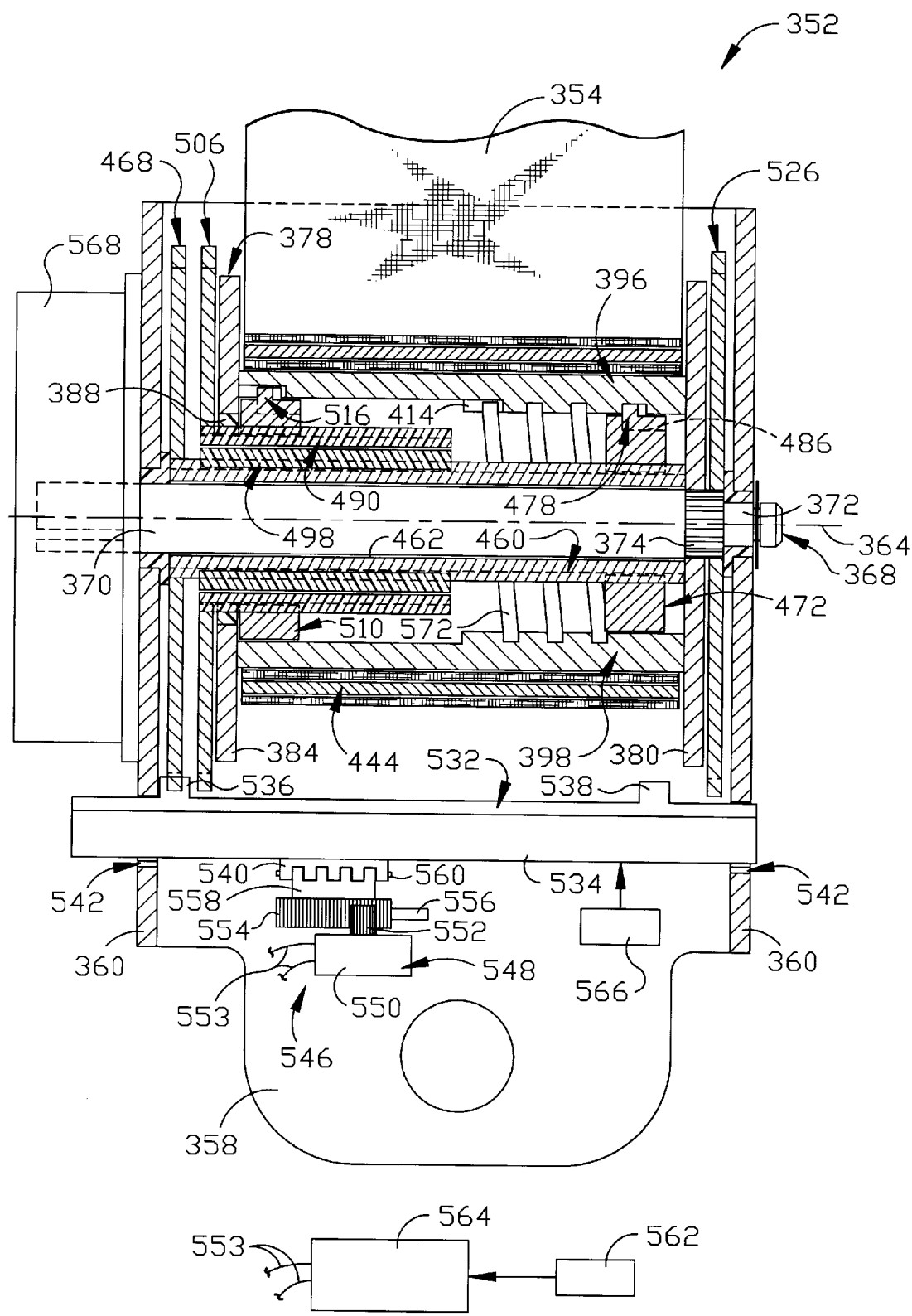
FIG. 17 is a view similar to FIG. 15, but with parts in a different position.
Figure 18:
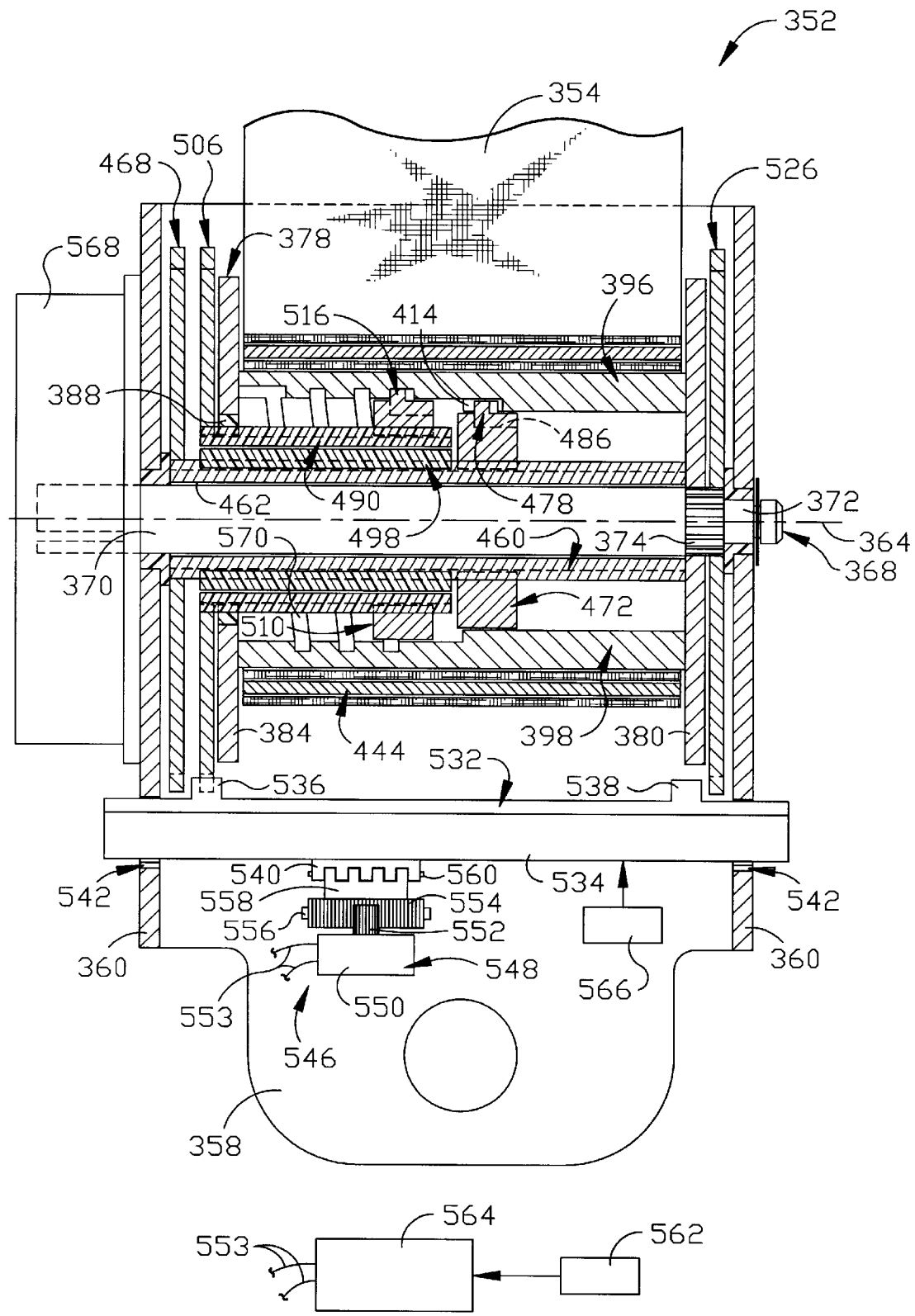
FIG. 18 is a view similar to FIG. 15, but with parts in a different position.

An actuator 566 (schematically shown) of the retractor 352 causes pivoting of the lock pawl 532 from a release position (FIG. 15) to a selective blocking position (shown in FIGS. 17 and 18). The actuator 566 has any suitable construction to cause pivoting of the lock pawl 532 when it is desired to restrain the vehicle occupant, such as during a vehicle collision.

When the lock pawl 532 is in the release position, the projections 536, 538 do not engage the teeth of any of the ratchet wheels 468, 506 and 526. When the lock pawl 532 is pivoted to the selective blocking position (for example FIGS. 17 and 18) one of the projections 536 or 538 engages one of the ratchet wheels 468, 506 or 526. Specifically, dependent upon the longitudinal position of the lock pawl 532, the projection 536 may engage the ratchet wheel 468, the projection 536 may engage the ratchet wheel 506, or the projection 538 may engage the ratchet wheel 526. Rotation of only the selected/engaged ratchet wheel in the webbing withdrawal direction is prevented. Rotation of the selected/ engaged ratchet wheel is not prevented in the webbing retraction direction B because of the slope of the ratchet wheel teeth.

The retractor 352 (FIG. 15) includes a drive assembly 568 which biases the shaft 368 to rotate in the webbing retraction direction. The drive assembly 568 may be of any suitable construction, for example, a flat spring within a housing mounted on a side of the frame 358 with the spring connected to the end of the shaft 368.

When the vehicle occupant is initially seated within the vehicle, the vehicle occupant pulls the webbing 354 to extend the webbing across the occupant's body. The actuator 566 is not in an activated state and the lock pawl 532 is in its release position so that none of the ratchet wheels 468, 506 or 526 is engaged by the projections 536, 538. The pulling force on the webbing 354 causes the spool assembly 378 to rotate in the webbing withdrawal direction. Rotational force is transferred to the shaft 368 by the disk 380, and the shaft is rotated against the bias provided by the drive assembly 568.

During the rotation, the cutting elements 478 and 516 do not penetrate to the material of the first spool sleeve half 396 and the cutters 472 and 510 are rotated with the spool assembly 378. The tube shafts 460 and 490 are rotated with the cutters 472 and 510. Also, rotational force can be transmitted from the disk 384 through the bushing 388 to the tube shaft 490, and from the tube shaft 490 through the bushing 498 to the tube shaft 460. Accordingly, the spool assembly 378, the ratchet wheels 468, 506 and 526, the cutters 472 and the 510, and the tube shafts 460 and 490 rotate together as a unit.

Similarly, when the vehicle occupant is preparing to exit the vehicle and the webbing 354 is released, the drive assembly 568 biases the shaft 368 and the spool assembly 378 to rotate in the webbing retraction direction. The spool assembly 378, the ratchet wheels 468, 506 and 526, the cutters 472 and 510, and the tube shafts 460 and 490 rotate together and there is no relative rotation between these parts.

During use of the retractor 352, the sensor 562 provides a signal to the controller 564 and the controller controls the shuttle mechanism 546 in response to the signal. The shuttle mechanism 546 may be constantly operationally active, or operationally inactive and then operationally active at the beginning of an emergency condition, such as a vehicle collision. The shuttle mechanism 546 moves the lock pawl 532 such that either the projection 536 is aligned with the ratchet wheel 468, the projection 536 is aligned with the ratchet wheel 506, or the projection 538 is aligned with the ratchet wheel 526.

When it is desired to restrain the vehicle occupant with the webbing 354, such as during a vehicle collision, the actuator 566 moves the lock pawl 532 from its release position (FIG. 15) to its selective pawl engaging position (see FIGS. 17 and 18). Only one of the ratchet wheels 468, 506 and 526 is engaged and locked from further rotation in the webbing withdrawal direction A.

If the shuttle mechanism 546 has been operated such that the projection 538 is aligned with, and engages, the ratchet wheel 526 (not shown), the shaft 368 and the spool assembly 378 are blocked against rotation in the webbing withdrawal direction A and webbing withdrawal is completely prevented. The complete blocking of webbing withdrawal is useful in the vehicle is involved in a relatively minor collision, or if the vehicle occupant is out of a desired position, e.g., too close to the windshield.

If the shuttle mechanism 546 has moved the lock pawl 532 such that the projection 536 is aligned to engage and block the ratchet wheel 468 (FIG. 17), the ratchet wheel 468, the tube shaft 460 and the cutter 472 are arrested from rotation in the webbing withdrawal direction A. The tension force in the webbing 354 urges the spool assembly 378 to rotate relative to the now stationary cutter 472. This tension force is proportional to the pressing force applied by the vehicle occupant to the webbing 354. The surface 414 (FIG. 16) bears against the end portion 480 of the cutting element 478. If the force with which the surface 414 bears against the end portion 480 is below a predetermined force, the cutting element 478 does not penetrate into the material of the first spool sleeve half 396 at the surface 414 and spool assembly 378 does not rotate relative to the stationary cutter 472.

If the force is above the predetermined force, the cutting element 478 overcomes the resistance of the material of the first spool sleeve half 396, and penetrates into and cuts the material of the first spool sleeve half. The cutter 472 cuts a segment of material away from the first spool sleeve half 396 to create a groove 572 (FIG. 17). The helical segment shape of the cutting element 478 causes the cutter 472 to move axially along the tube shaft 460 as the spool sleeve halves 396, 398 are rotated relative to the cutter 472. Accordingly, the groove 572 has a helical shape. The cutting element 478 passes from the first spool sleeve half 396 to the second spool sleeve half 398, and subsequently back to the first spool sleeve half in continued succession as long as cutting by the cutting element 478 occurs. The cutting by the cutting element 478 continues until the cutter 472 abuts the disk 380. During cutting, the cut-away material is received in the slot 486. Energy is absorbed during cutting of the spool sleeve halves 396, 398 by the cutter 472.

The amount of energy which is absorbed during the cutting by the cutter 472 is proportional to the force required to cut the spool sleeve halves 396, 398. The force is proportional to the amount of material removed from the spool sleeve halves 396, 398 and the ease with which the cutter 472 cuts. The amount of material removed is dependent upon the cross-sectional area of the cutting element 478. The ease of cutting by the cutter 472 is related to the distance of the cutting element 478 from the axis 364, which is defined as a working radius.

If the projection 536 has been aligned to engage with the ratchet wheel 506 (FIG. 18), rotation of the ratchet wheel 506, the tube shaft 490 and the cutter 510 is arrested. The spool assembly 378 is urged to rotate relative to the rotationally stationary cutter 510. The material of the first spool sleeve half 396 at the surface 420 (FIG. 16) bears against the end portion of the cutting element 516. Also, the disk 384 tends to rotationally slide about the bushing 388.

The force urging the relative rotation of the spool assembly 378 relative to the cutter 510 is proportional to the amount of tension in the webbing 354. If the force urging the rotation of the spool assembly 378 relative to the cutter 510 is below a predetermined force, the cutting element 516 does not penetrate into the material of the first spool sleeve half 396 and the spool assembly 378 does not rotate relative to the cutter 510.

If the force urging the spool assembly 378 to rotate relative to the cutter 510 is above the predetermined force, the cutting element 516 overcomes the resistance of the material of the first spool sleeve half 396, and penetrates into and cuts the material of the first spool sleeve half. The cutting element 516 cuts a segment of material away from the first spool sleeve half 396 to create a groove 570 (FIG. 18). The cutting element 516 passes from the first spool sleeve half 396 to the second spool sleeve half 398 and subsequently back to the first spool sleeve half such that the groove is continuous. The helical segment shape of the cutting element 516 causes the cutter 510 to move axially as the spool sleeve halves 396, 398 are rotated about the cutter. Accordingly, for each rotation of the spool sleeve halves 396, 398, the cutter 510 has been moved over such that the cutting element 516 cuts a new section of material. The cut-away material is received in the slot 522 and the cutting continues until the cutter 510 abuts the shoulders 410 and 436. The other ratchet wheels 468 and 526 are not blocked and rotate with the spool assembly 378. Accordingly, the tube shaft 460 and the cutter 472 are rotated, and no cutting is performed by the cutting element 478 at the surface 414 on the first spool sleeve half 396.

During the cutting of the spool sleeve halves 396, 398 by the cutter 510, energy is absorbed. The amount of energy which is absorbed is proportional to the force required to cut the spool sleeve halves 396, 398 by the cutter 510. The force is proportional to the amount of material removed and the ease with which the cutter 510 cuts. The amount of material removed is dependent upon the cross-sectional area of the cutting element 516. The ease of cutting is related to the distance of the cutting element 516 from the axis, i.e., the working radius of the cutting element 516.

During cutting by either the cutter 472 or the cutter 510, an amount of webbing 354 is paid out from the retractor 352, and the vehicle occupant is permitted to move forward slightly. The deceleration of the vehicle occupant occurs over a longer period of time. The resistance to rotation of the spool assembly 378 and the amount of energy which is absorbed during cutting by the cutter 472 are less than the resistance to rotation of the spool assembly and the amount of energy absorbed during cutting by the cutter 510 because the cross-sectional area and the working radius of the cutting elements 478 and 516 are chosen such that less force is needed to cause cutting by the cutting element 478. The amount of energy absorbed during cutting by the cutter 472 is useful for smaller vehicle occupants, e.g., occupants with a weight within the fifth weight percentile range. The amount of energy absorbed during cutting by the cutter 510 is useful for a person of average weight within the population.

From the above description of the invention, those skilled in the art will perceive improvements, changes and modifications. Such improvements, changes and modifications within the skill of the art are intended to be covered by the appended claims.

Having described the invention, the following is claimed:

1. A seat belt webbing retractor comprising:

a spool sleeve around which seat belt webbing is wound, said spool sleeve being rotatable in webbing withdrawal and webbing retraction directions;

means for stopping rotation of said spool sleeve in the webbing withdrawal direction;

means for enabling rotation of said spool sleeve in the webbing withdrawal direction subsequent to being stopped by said means for stopping and upon the occurrence of tension in the webbing above a predetermined amount;

cutter means located radially within said spool sleeve for cutting into said spool sleeve when said spool sleeve rotates in the webbing withdrawal direction subsequent to being stopped by said means for stopping and in response to tension in the webbing above the predetermined amount;

said means for stopping said spool sleeve including a member rotatable in the withdrawal and retraction directions, and means for blocking rotation of said rotatable member in the withdrawal direction, said spool sleeve being rotatable relative to said rotatable member in response to tension in the webbing above the predetermined amount; and a shaft fixed for rotation with said rotatable member, said cutter means being constrained to rotate with said shaft and being movable along said shaft during rotation of said spool sleeve relative to said rotatable member in the webbing withdrawal direction, said cutter means cutting a helical groove in said spool as said cutter means rotates with said shaft and moves along said shaft.

2. A seat belt webbing retractor as defined in claim 1 wherein said shaft has surface means engaging said cutter means for constraining said cutter means to rotate with said shaft and for limiting radial movement of said cutter means relative to said shaft.

3. A seat belt retractor as defined in claim 2 wherein:

said spool sleeve has a preformed helical groove extending along an inner surface of said spool sleeve, said cutting element following said preformed helical groove during cutting of said spool sleeve by said cutter means.

4. A seat belt webbing retractor comprising:

a spool sleeve around which seat belt webbing is wound, said spool sleeve being rotatable in webbing withdrawal and webbing retraction directions;

means for stopping rotation of said spool sleeve in the webbing withdrawal direction;

means for enabling rotation of said spool sleeve in the webbing withdrawal direction subsequent to being stopped by said means for stopping and upon the occurrence of tension in the webbing above a predetermined amount;

cutter means located radially within said spool sleeve for cutting into said spool sleeve when said spool sleeve rotates in the webbing withdrawal direction subsequent to being stopped by said means for stopping and in response to tension in the webbing above the predetermined amount;

said means for stopping said spool sleeve including a member rotatable in the withdrawal and retraction directions, and means for blocking rotation of said rotatable member in the withdrawal direction, said spool sleeve being rotatable relative to said rotatable member in response to tension in the webbing above the predetermined amount; and a second rotatable member rotatable in the webbing withdrawal and webbing retraction directions, and means for blocking rotation of said second rotatable member in the withdrawal direction, said spool sleeve being rotatable in the webbing withdrawal direction relative to said second rotatable member, said cutter means including a first cutting device which cuts into said spool sleeve when said spool sleeve rotates relative to said first rotatable member, and a second cutting device which cuts into said spool sleeve when said spool sleeve rotates relative to said second rotatable member.

5. A retractor as set forth in claim 4, wherein said first and second rotatable members are first and second ratchet wheels, respectively, said means for blocking rotation of said first rotatable member and said means for blocking rotation of said second rotatable member comprises a pawl movable to engage only one of said first and second ratchet wheels.

6. A retractor as set forth in claim 5, including a third ratchet wheel fixed to said spool sleeve, said pawl being movable to engage only one of said first, second and third ratchet wheels.

7. A seat belt webbing retractor comprising:

a spool sleeve around which seat belt webbing is wound, said spool sleeve being rotatable in webbing withdrawal and webbing retraction directions;

means for stopping rotation of said spool sleeve in the webbing withdrawal direction;

means for enabling rotation of said spool sleeve in the webbing withdrawal direction subsequent to being stopped by said means for stopping and upon the occurrence of tension in the webbing above a predetermined amount; and cutter means located radially within said spool sleeve for cutting into said spool sleeve when said spool sleeve rotates in the webbing withdrawal direction subsequent to being stopped by said means for stopping and in response to tension in the webbing above the predetermined amount;

wherein said cutter means has a cutting element for penetrating the material of the spool sleeve; and wherein said cutting element is inclined with respect to a plane perpendicular to a rotational axis of said spool sleeve for causing said cutter means to move axially relative to said spool sleeve during cutting of said spool sleeve by said cutter means.

8. A retractor as set forth in claim 7, wherein said cutting element is helical in shape and extends about the axis.

9. A retractor as set forth in claim 7, wherein said cutter means includes a body supporting said cutting element.

10. A retractor as set forth in claim 9, wherein said body and said cutting element of said cutter means are formed as one piece.

11. A seat retractor as set forth in claim 9, wherein said body and said cutting element of said cutter means are brazed together.

12. A retractor as set forth in claim 9, wherein said body and said cutting element of said cutter means are steel.

13. A retractor as set forth in claim 9, wherein said cutting element is carbide.

14. A retractor as set forth in claim 7, wherein said spool sleeve includes a plurality of pieces.

15. A seat belt webbing retractor comprising:
a spool sleeve around which seat belt webbing is wound, said spool sleeve being rotatable in webbing withdrawal and webbing retraction directions;
means for stopping rotation of said spool sleeve in the webbing withdrawal direction;
means for enabling rotation of said spool sleeve in the webbing withdrawal direction subsequent to being stopped by said means for stopping and upon the occurrence of tension in the webbing above a predetermined amount; and
cutter means located radially within said spool sleeve for cutting into said spool sleeve when said spool sleeve rotates in the webbing withdrawal direction subsequent to being stopped by said means for stopping and in response to tension in the webbing above the predetermined amount;
said spool sleeve including a plurality of pieces;
said plurality of pieces including first and second pieces each having a hollow half cylinder shape and each having two sides extending parallel to a rotational axis of the spool sleeve, said sides of said first piece engage said sides of said second piece.

16. A retractor as set forth in claim 15, including a collar extending about said first and second pieces to hold said first and second pieces together.

17. A seat belt webbing retractor comprising:
a spool sleeve around which seat belt webbing is wound, said spool sleeve being rotatable in webbing withdrawal and webbing retraction directions;
means for stopping rotation of said spool sleeve in the webbing withdrawal direction;
means for enabling rotation of said spool sleeve in the webbing withdrawal direction subsequent to being stopped by said means for stopping and upon the occurrence of tension in the webbing above a predetermined amount; and
cutter means for cutting into said spool sleeve when said spool sleeve rotates in the webbing withdrawal direction subsequent to being stopped by said means for stopping and in response to tension in the webbing above the predetermined amount, said cutter means including means for causing said cutter means to move along a rotational axis of said spool sleeve during cutting of said spool sleeve by said cutter means;
wherein said cutter means includes a helical projection extending about the axis.

18. A retractor as set forth in claim 17, wherein said cutter means includes a body supporting said helical projection.

19. A retractor as set forth in claim 18, wherein said body and said helical projection of said cutter means are formed as one piece.

20. A seat retractor as set forth in claim 18, wherein said body and said helical projection of said cutter means are brazed together.

21. A retractor as set forth in claim 18, wherein said body and said helical projection of said cutter means are steel.

22. A retractor as set forth in claim 18, wherein said helical projection is carbide.

23. A retractor as set forth in claim 13, wherein said helical projection has a portion which cuts said spool sleeve.

24. A seat belt retractor comprising:
a spool sleeve around which seat belt webbing is wound, said spool sleeve being rotatable about a rotational axis in webbing withdrawal and webbing retraction directions;
means for stopping rotation of said spool sleeve in the webbing withdrawal direction;
means for enabling rotation of said spool sleeve in the webbing withdrawal direction subsequent to being stopped by said means for stopping and upon the occurrence of tension in the webbing above a predetermined amount; and
cutter means for cutting into said spool sleeve when said spool sleeve rotates in the webbing withdrawal direction subsequent to being stopped by said means for stopping and in response to tension in the webbing above the predetermined amount;
said spool sleeve comprising a plurality of pieces fitted together and extending around the rotational axis of the spool sleeve;
said plurality of pieces including first and second pieces, said first and second pieces each having a hollow half cylinder shape and each having two sides extending parallel to the axis, said sides of said first piece engage said sides of said second piece.

25. A retractor as set forth in claim 24, wherein said two sides are at diametrically opposed locations.

26. A retractor as set forth in claim 24, including a collar extending about said two pieces.

27. A seat belt webbing retractor comprising:
a spool sleeve around which seat belt webbing is wound, said spool sleeve being rotatable about a rotational axis in webbing withdrawal and webbing retraction directions;
means for stopping rotation of said spool sleeve in the webbing withdrawal direction;
means for enabling rotation of said spool sleeve in the webbing withdrawal direction subsequent to being stopped by said means for stopping and upon the occurrence of tension in the webbing above a predetermined amount; and
cutter means for cutting into said spool sleeve when said spool sleeve rotates in the webbing withdrawal direction subsequent to being stopped by said means for stopping and in response to tension in the webbing above the predetermined amount;
said spool sleeve comprising a plurality of pieces fitted together and extending around the rotational axis of the spool sleeve;
said cutter means includes a portion inclined with respect to a plane perpendicular to the axis for causing said cutter means to move axially relative to said spool sleeve during cutting of said spool sleeve by said cutter means.

28. A retractor as set forth in claim 27, wherein said portion of said cutter means has a helical shape and extends about the axis.

29. A retractor as set forth in claim 27, wherein said cutter means includes a body supporting said inclined portion of said cutter means.

30. A retractor as set forth in claim 29, wherein said body and said inclined portion of said cutter means are formed as one piece.

31. A seat retractor as set forth in claim 29, wherein said body and said inclined portion of said cutter means are brazed together.

32. A retractor as set forth in claim 29, wherein said body and said inclined portion of said cutter means are steel.

33. A retractor as set forth in claim 29, wherein said inclined portion of said cutter means is carbide.

34. A seat belt webbing retractor for a vehicle, said retractor comprising:

a spool sleeve around which seat belt webbing is wound, said spool sleeve being rotatable about a rotational axis in webbing withdrawal and webbing retraction directions;

means for resisting rotation of said spool sleeve in the webbing withdrawal direction including cutter means for cutting into said spool sleeve when said spool sleeve rotates in the webbing withdrawal direction; and means for changing the amount of resistance provided by said means for resisting.

35. A retractor as set forth in claim 34, wherein said cutter means includes a plurality of cutting devices for cutting said spool sleeve, each of said cutting devices providing a different amount of resistance to rotation of said spool sleeve.

36. A retractor as set forth in claim 35, wherein said means for resisting rotation of said spool sleeve includes means for enabling a predetermined number of said plurality of said cutting devices to cut said spool sleeve.

37. A retractor as set forth in claim 36, wherein said means for enabling includes means for selecting the predetermined number of said cutting devices in response to a condition external to said retractor.

38. A retractor as set forth in claim 35, wherein said means for resisting includes a plurality of ratchet wheels rotatable in the webbing withdrawal and webbing retraction directions.

39. A retractor as set forth in claim 38, wherein said means for resisting includes means for blocking rotation in the webbing withdrawal direction of a predetermined number of said plurality of ratchet wheels in response to a condition indicative of a vehicle collision of a predetermined severity.

40. A retractor as set forth in claim 39, wherein said means for blocking includes a pawl, said pawl being pivotable between a release position permitting said ratchet wheels to rotate and a blocking position preventing rotation of said predetermined number of said ratchet wheels.

41. A retractor as set forth in claim 40, wherein said pawl is movable along a direction parallel to the rotational axis of said spool sleeve.

42. A retractor as set forth in claim 39, wherein one of said ratchet wheels is fixed to rotate with said spool sleeve.

43. A retractor as set forth in claim 35, wherein said means for resisting includes a plurality of shaft elements, a first one of said cutting devices is located on a first one of said shaft elements and a second one of said cutting devices is located on a second one of said shaft elements.

44. A retractor as set forth in claim 43, wherein said first shaft element has surface means for constraining said first cutting device to rotate with said first shaft element, said second shaft element has surface means for constraining said second cutting device to rotate with said second shaft element.

45. A retractor as set forth in claim 35, wherein said plurality of cutter means are located within said spool sleeve.

46. A retractor as set forth in claim 35, wherein said first cutting device includes a portion inclined with respect to a plane perpendicular to a rotational axis of said spool sleeve for causing said first cutting device to move axially relative to said spool sleeve during cutting of said spool sleeve by said first cutting device.

47. A retractor as set forth in claim 46, wherein said second cutting device includes a portion inclined with respect to the plane perpendicular to the axis for causing said second cutting device to move axially relative to said spool sleeve during cutting of said spool sleeve by said second cutting device.

48. A retractor as set forth in claim 47, wherein each of said first and second cutting devices includes a body supporting said respective inclined portion.

49. A retractor as set forth in claim 48, wherein for each of said first and second cutting devices said body and said inclined portion are formed as one piece.

50. A seat retractor as set forth in claim 48, wherein for each of said first and second cutting devices said body and said inclined portion are brazed together.

51. A retractor as set forth in claim 48, wherein for each of said first and second cutting devices said body and said inclined portion are steel.

52. A retractor as set forth in claim 48, wherein for each of said first and second cutting devices said inclined portion is carbide.

* * * * *

UNITED STATES PATENT AND TRADEMARK OFFICE
CERTIFICATE OF CORRECTION

PATENT NO : 5,823,570
DATED : October 20, 1998
INVENTOR(S) : Wendell C. Lane, Jr. et al.

It is certified that error appears in the above-identified patent and that said Letters Patent is hereby corrected as shown below:

Col. 29, line 61
replace "13"
with --17--.

Signed and Sealed this

Eighth Day of June, 1999

Attest:

Q. TODD DICKINSON

*Attesting Officer*     *Acting Commissioner of Patents and Trademarks*